(12) United States Patent
Cunningham, III et al.

(10) Patent No.: US 10,773,642 B2
(45) Date of Patent: Sep. 15, 2020

(54) VEHICLE DRIVER NUDGE SYSTEM

(71) Applicants: Frazier Cunningham, III, Belleville, MI (US); Cindita D. Cunningham, Belleville, MI (US)

(72) Inventors: Frazier Cunningham, III, Belleville, MI (US); Cindita D. Cunningham, Belleville, MI (US)

(*) Notice: Subject to any disclaimer, the term of this patent is extended or adjusted under 35 U.S.C. 154(b) by 0 days.

(21) Appl. No.: 16/030,480

(22) Filed: Jul. 9, 2018

(65) Prior Publication Data

US 2018/0319327 A1 Nov. 8, 2018

Related U.S. Application Data

(63) Continuation-in-part of application No. 15/804,597, filed on Nov. 6, 2017, now abandoned, which is a
(Continued)

(51) Int. Cl.
*B60Q 1/48* (2006.01)
*G08G 1/16* (2006.01)
(Continued)

(52) U.S. Cl.
CPC ............ *B60Q 1/488* (2013.01); *B60K 35/00* (2013.01); *B60Q 5/006* (2013.01); *B60R 1/00* (2013.01); *B62D 15/027* (2013.01); *G08G 1/143* (2013.01); *G08G 1/147* (2013.01); *G08G 1/162* (2013.01); *G08G 1/167* (2013.01); *G08G 1/168* (2013.01); *B60K 2370/154* (2019.05);
(Continued)

(58) Field of Classification Search
CPC .... B60Q 1/488; B60Q 2900/10; B60Q 5/006; G08G 1/167; G08G 1/143; G08G 1/147; G08G 1/168; G08G 1/162; B62D 15/027; B60K 35/00; B60K 2370/5915; B60K 2370/332; B60K 2370/178; B60K 2370/172; B60K 2370/158; B60K 2370/782; B60K 2370/797; B60K 2370/21; B60K 2370/152; B60K 2370/154; B60R 2300/301; B60R 2300/806; B60R 2300/50; B60R 1/00
See application file for complete search history.

(56) References Cited

U.S. PATENT DOCUMENTS 2,866,175 A * 12/1958 Slater .................... B60Q 1/488
340/468
7,683,765 B2 3/2010 Requejo et al.
(Continued)

FOREIGN PATENT DOCUMENTS

CN 204332075 11/2014
DE 102004047861 A1 * 4/2006 ......... B62D 15/0265
(Continued)

*Primary Examiner* — Rodney A Butler
(74) *Attorney, Agent, or Firm* — Young Basile Hanlon & MacFarlane, P.C.

(57) ABSTRACT

A driver nudge system is operated within a vehicle to indicate a warning to a driver of the vehicle. The system includes a steering wheel, a vehicle sensor monitoring an operating environment of the vehicle, and an electric motor connected to the steering wheel configured to nudge the steering wheel in an opposite direction to a threat diagnosed according to data from the vehicle sensor.

20 Claims, 22 Drawing Sheets

Related U.S. Application Data continuation-in-part of application No. 15/096,776, filed on Apr. 12, 2016, now Pat. No. 9,809,157, which is a continuation of application No. 14/533,849, filed on Nov. 5, 2014, now Pat. No. 9,333,908.

(60) Provisional application No. 61/900,459, filed on Nov. 6, 2013.

(51) Int. Cl.
   *B60K 35/00* (2006.01)
   *B62D 15/02* (2006.01)
   *B60Q 5/00* (2006.01)
   *B60R 1/00* (2006.01)
   *G08G 1/14* (2006.01)

(52) U.S. Cl.
   CPC .. *B60K 2370/158* (2019.05); *B60K 2370/172* (2019.05); *B60K 2370/178* (2019.05); *B60K 2370/21* (2019.05); *B60K 2370/332* (2019.05); *B60K 2370/5915* (2019.05); *B60K 2370/782* (2019.05); *B60K 2370/797* (2019.05); *B60Q 2900/10* (2013.01); *B60R 2300/301* (2013.01); *B60R 2300/50* (2013.01); *B60R 2300/806* (2013.01)

(56) References Cited

U.S. PATENT DOCUMENTS

| | | | |
|---|---|---|---|
| 8,248,270 B2 | 8/2012 | Nieves | |
| 9,718,400 B2 | 8/2017 | Knobl et al. | |
| 2001/0027363 A1* | 10/2001 | Shimazaki | B60R 1/00 701/41 |
| 2003/0010145 A1* | 1/2003 | Seekircher | F16H 59/105 74/336 R |
| 2003/0025597 A1* | 2/2003 | Schofield | B60Q 1/346 340/435 |
| 2004/0061600 A1* | 4/2004 | Wehner | G01S 5/0072 340/435 |
| 2005/0236894 A1* | 10/2005 | Lu | B60T 8/1755 303/139 |
| 2006/0185921 A1* | 8/2006 | Cieler | B60W 50/16 180/204 |
| 2008/0208407 A1* | 8/2008 | Tanaka | B62D 5/0463 701/41 |
| 2009/0052156 A1* | 2/2009 | Mano | B60Q 1/122 362/37 |
| 2009/0234543 A1* | 9/2009 | Groitzsch | B60T 7/22 701/45 |
| 2012/0081234 A1* | 4/2012 | Shaffer | G08G 1/167 340/905 |
| 2012/0143439 A1* | 6/2012 | Kim | B60W 50/16 701/36 |
| 2012/0154135 A1* | 6/2012 | Tronnier | B60W 30/18163 340/435 |
| 2013/0238192 A1* | 9/2013 | Breu | G01S 13/726 701/41 |
| 2013/0277136 A1* | 10/2013 | Young | B62D 5/06 180/422 |
| 2014/0005875 A1* | 1/2014 | Hartmann | B60W 10/06 701/23 |
| 2014/0071278 A1* | 3/2014 | Assaf | B60R 1/12 348/148 |
| 2014/0081476 A1* | 3/2014 | Verdugo-Lara | G08G 1/168 701/1 |
| 2014/0218522 A1* | 8/2014 | Lavoie | G08G 1/0962 348/148 |
| 2014/0297172 A1* | 10/2014 | Huelsen | G01S 13/931 701/301 |
| 2015/0203030 A1* | 7/2015 | Knobl | B60Q 9/00 340/438 |

FOREIGN PATENT DOCUMENTS

| | | | | |
|---|---|---|---|---|
| DE | 2009050941 | | 5/2011 | |
| DE | 102011056042 A1 | * | 6/2013 | ............ B62D 1/181 |
| GB | 2490094 A | * | 10/2012 | ............ G01S 7/4026 |
| KR | 20120071027 | | 2/2012 | |
| KR | 20130136219 | | 12/2013 | |
| WO | WO 2011/095510 | | 2/2011 | |
| WO | WO 2016/132892 | | 2/2016 | |

* cited by examiner

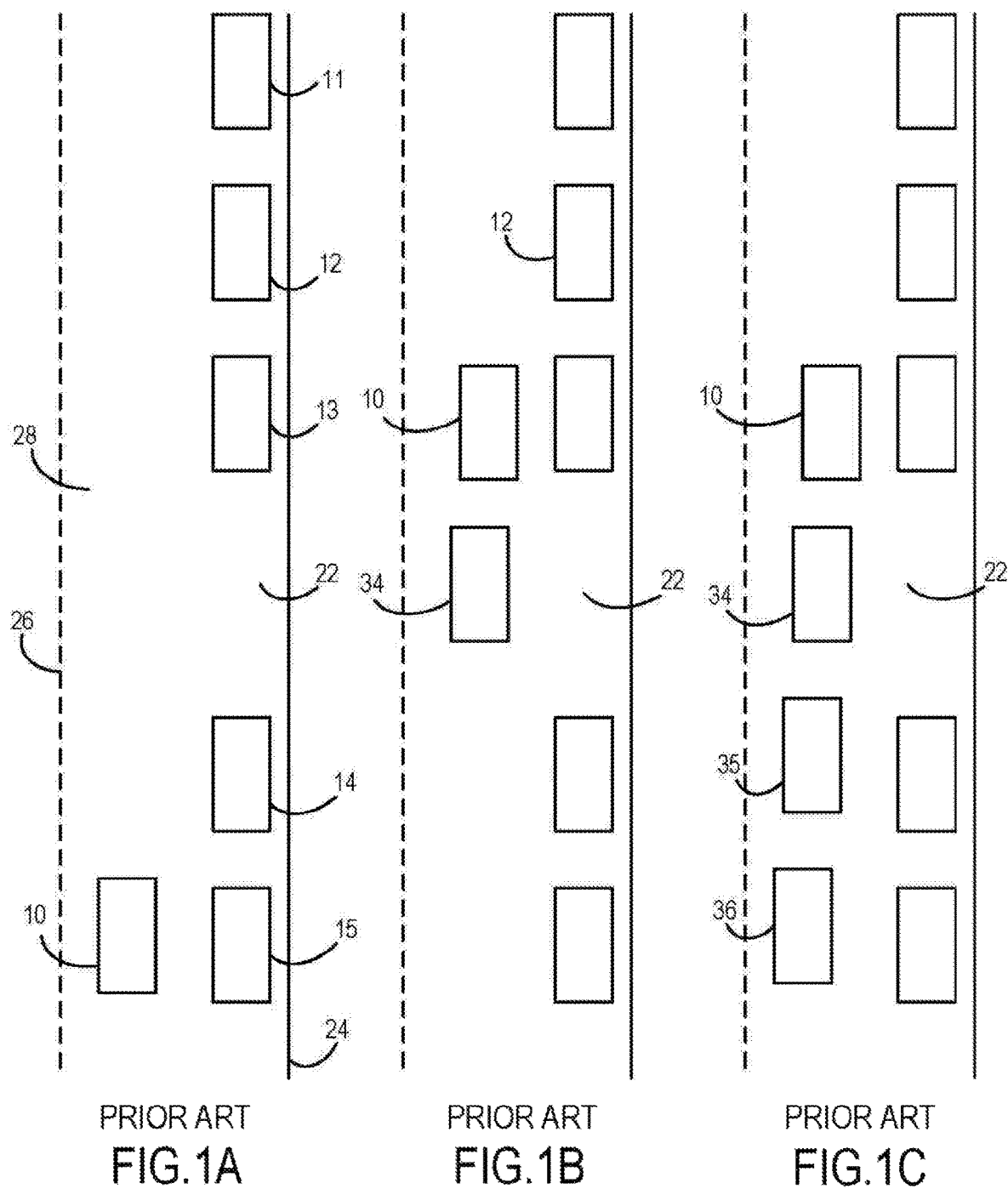
PRIOR ART
FIG.1A
PRIOR ART
FIG.1B
PRIOR ART
FIG.1C

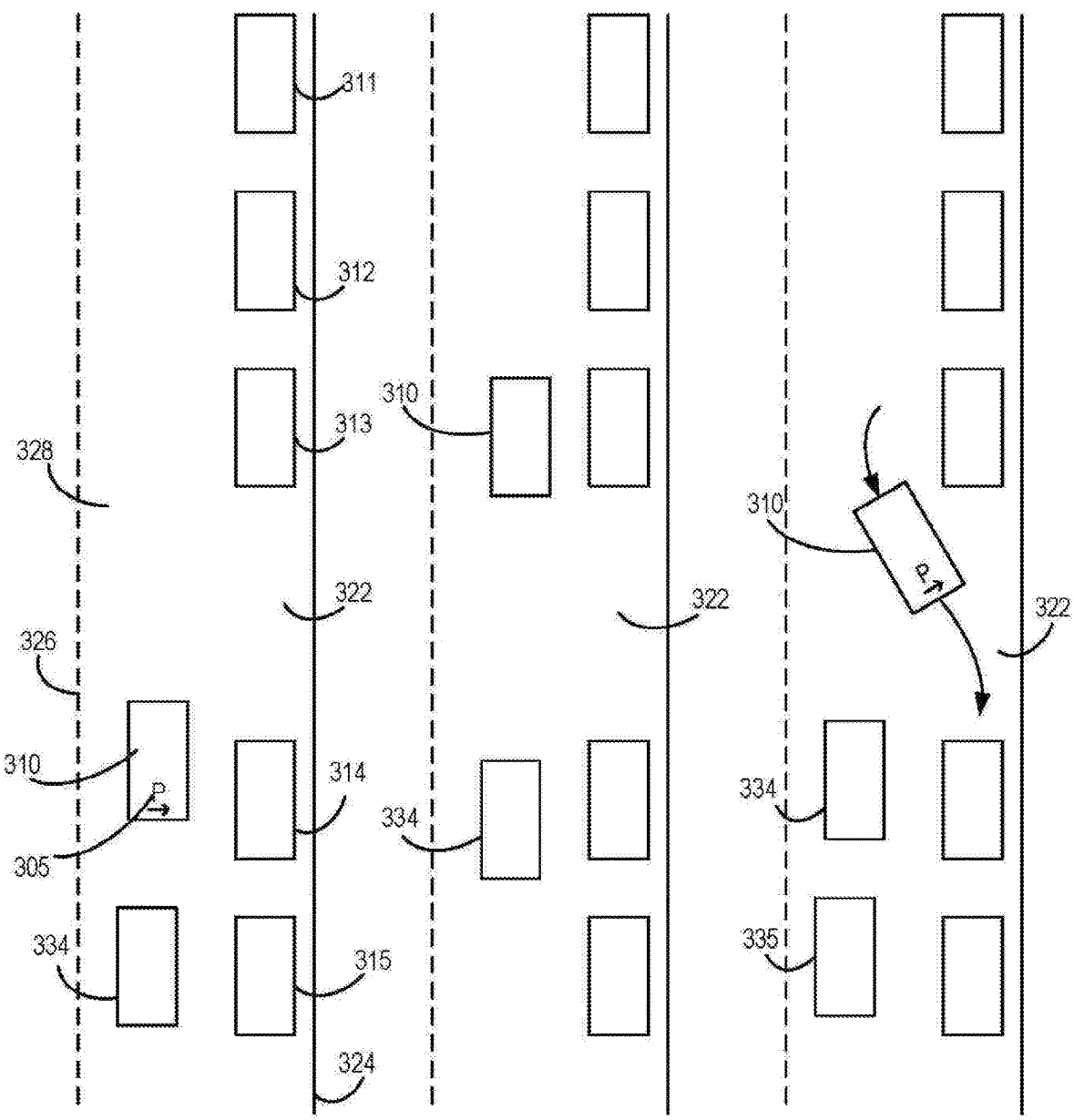
FIG.2A  FIG.2B  FIG.2C

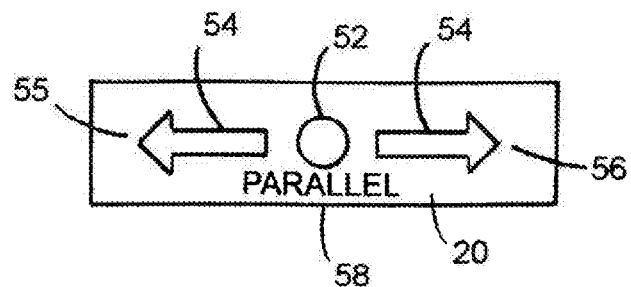
FIG.3
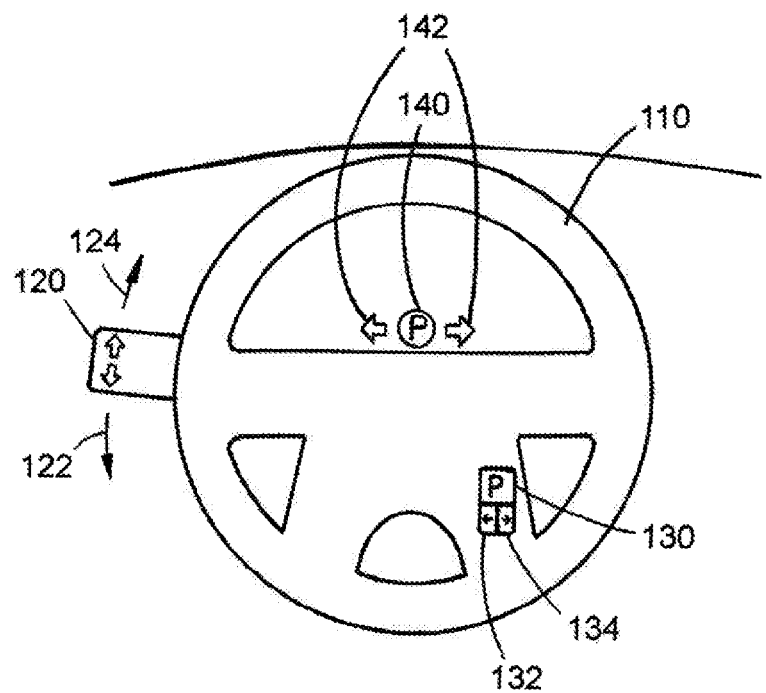
FIG.4

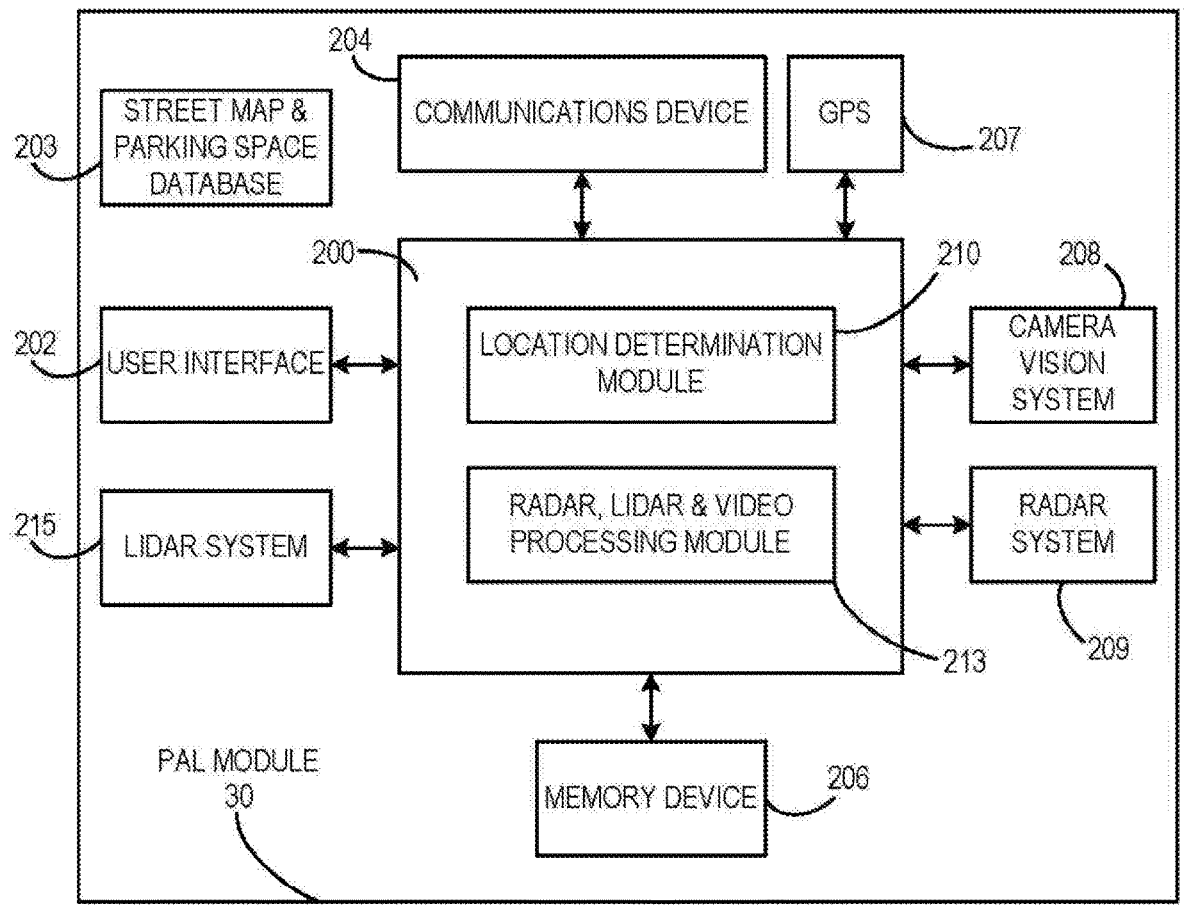
FIG.5

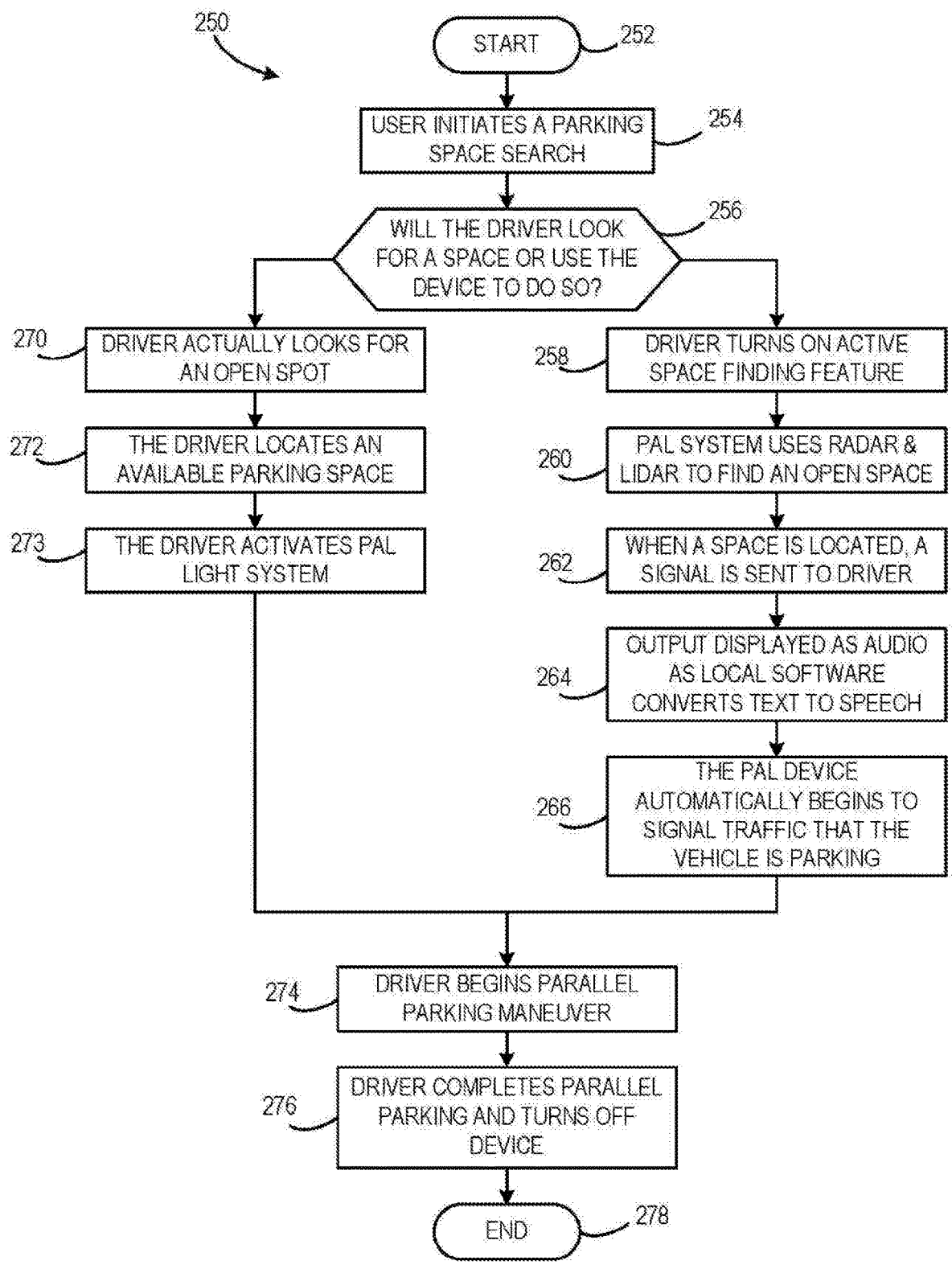
FIG.6

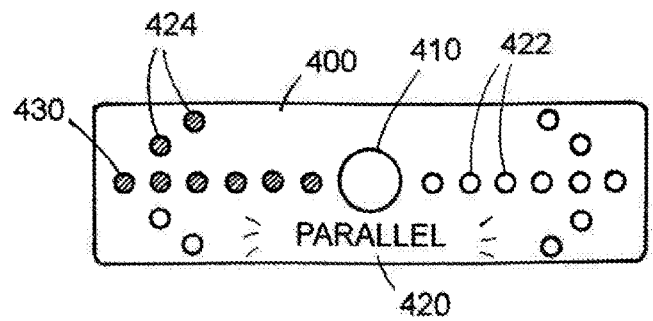
FIG.7A
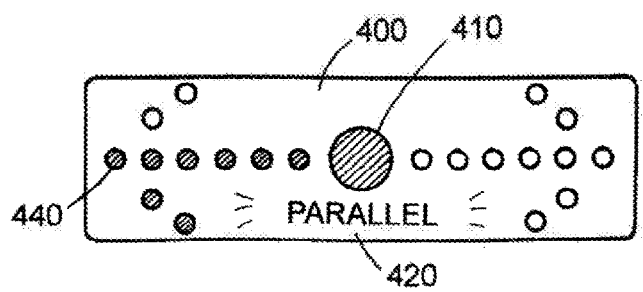
FIG.7B
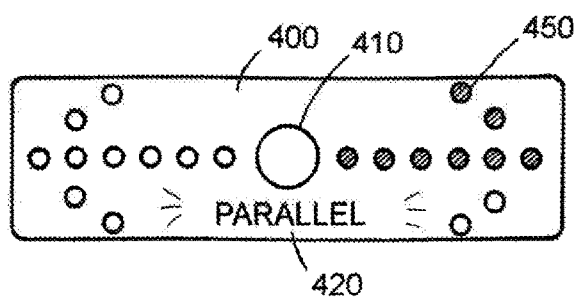
FIG.7C
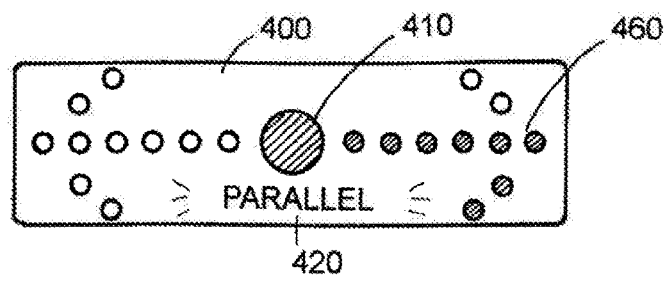
FIG.7D

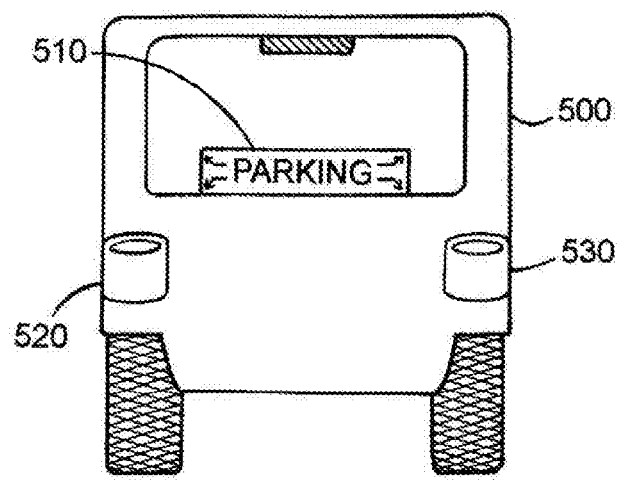
FIG.8
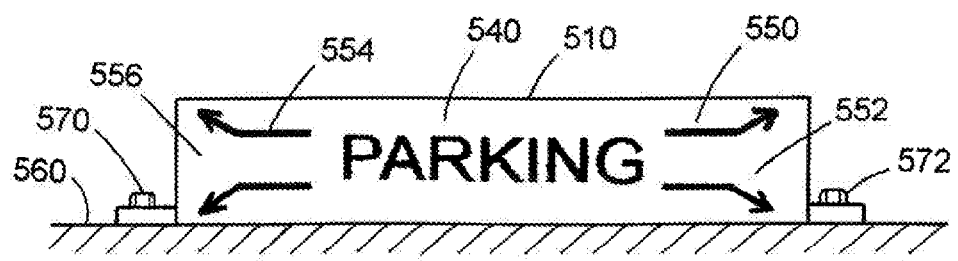
FIG.9

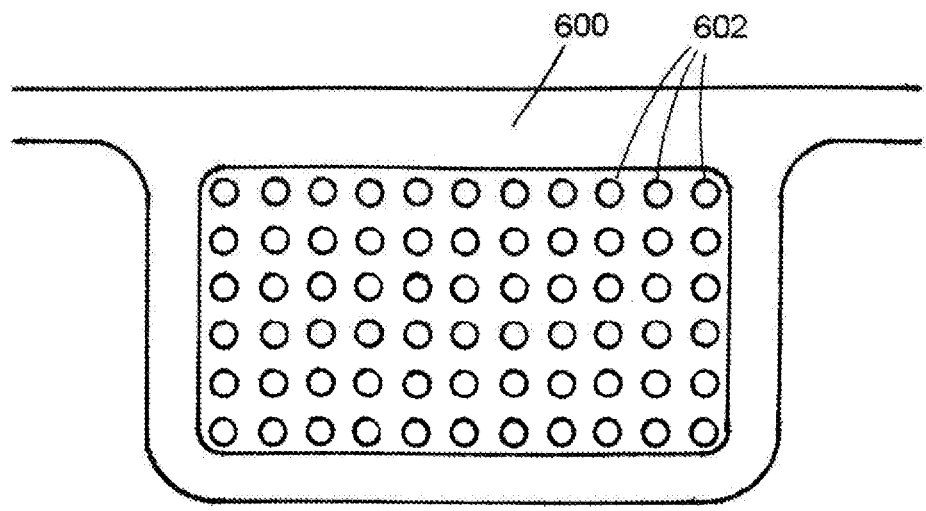
FIG.10
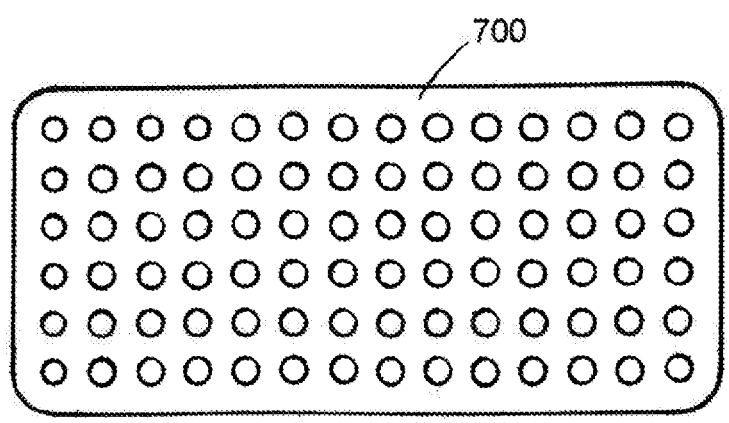
FIG.11A

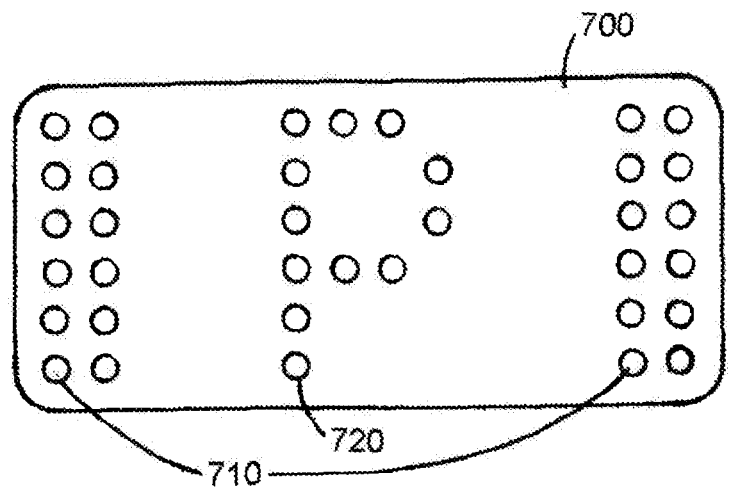
FIG.11B
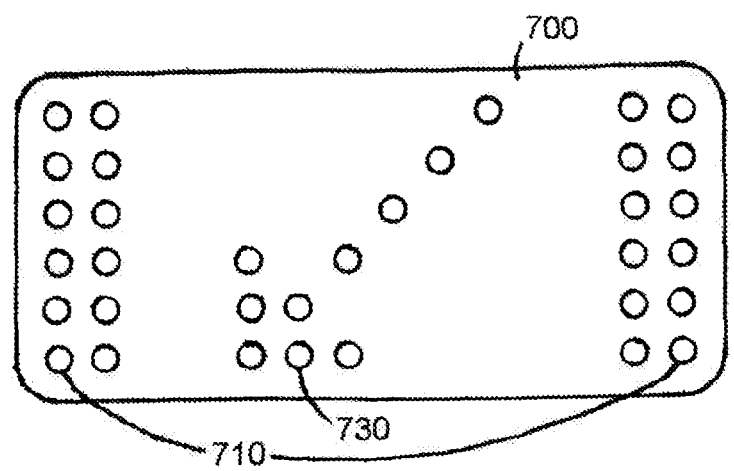
FIG.11C

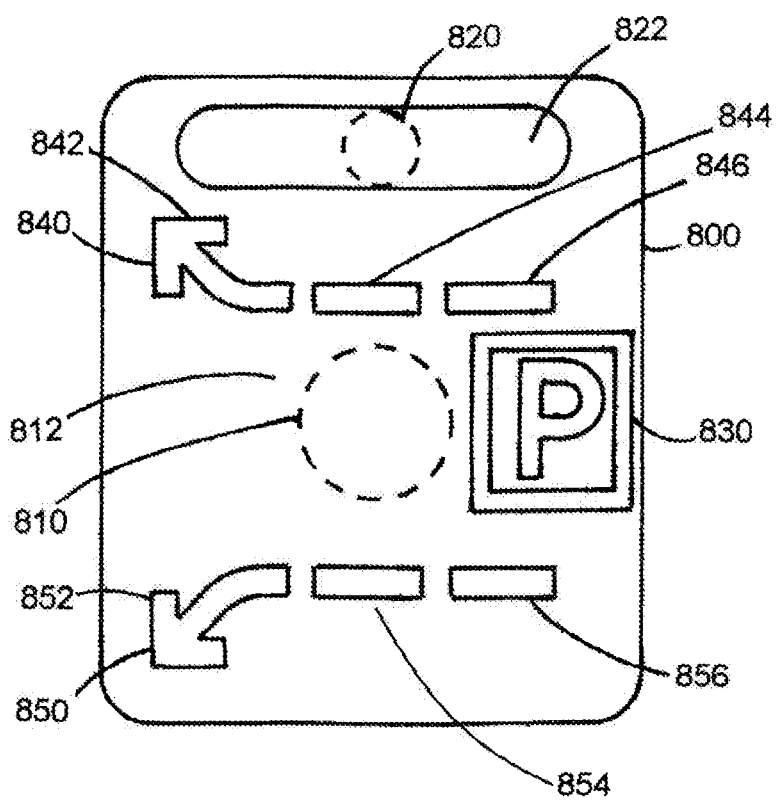
FIG.12

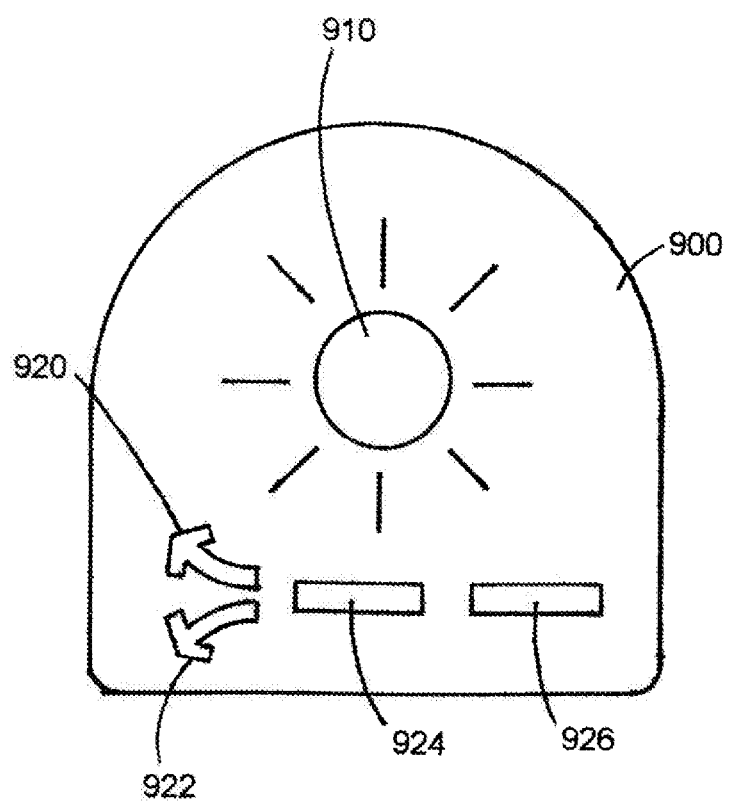
FIG. 13

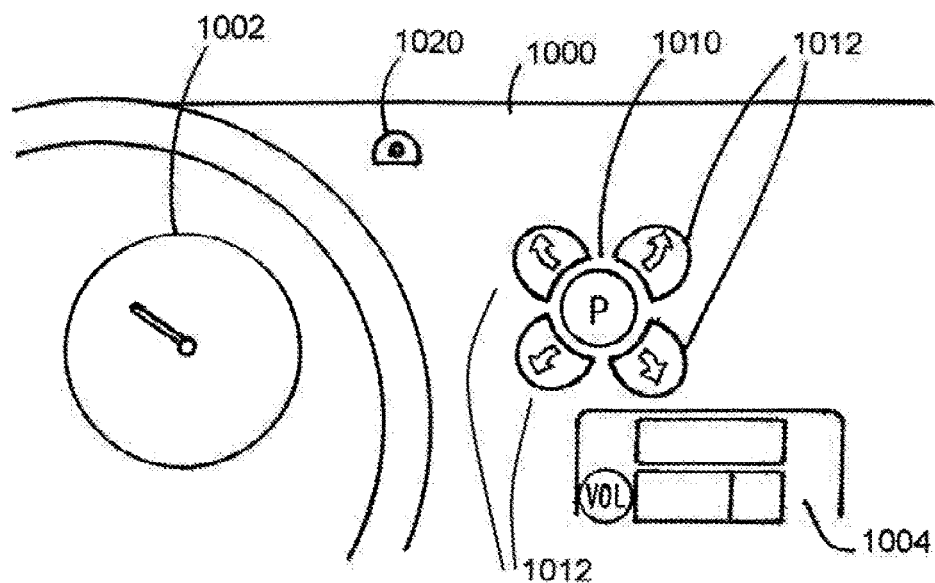
FIG.14
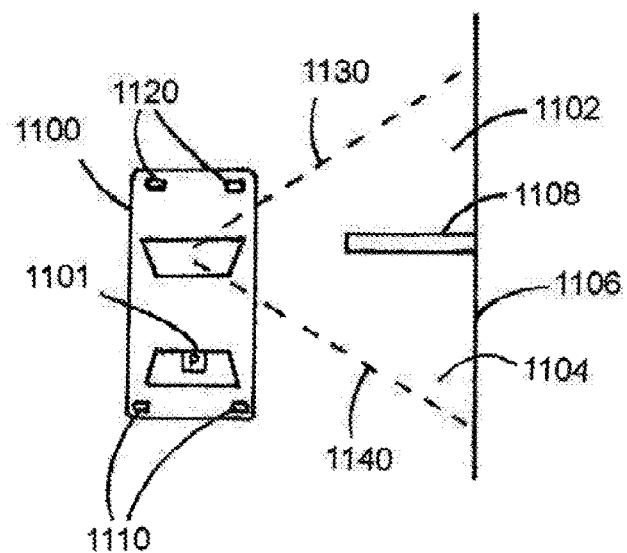
FIG.16

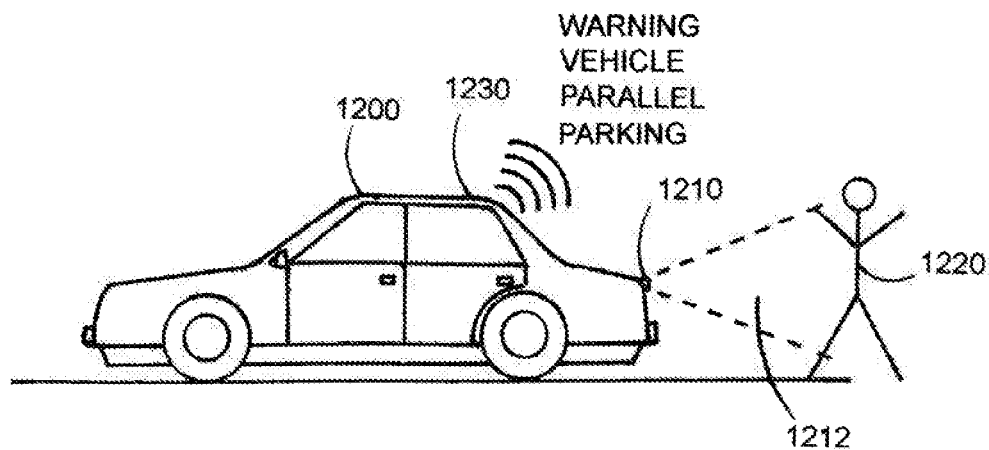
FIG.15
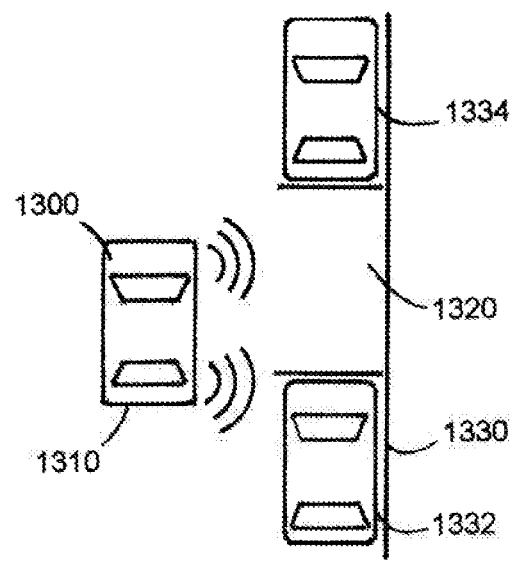
FIG.17

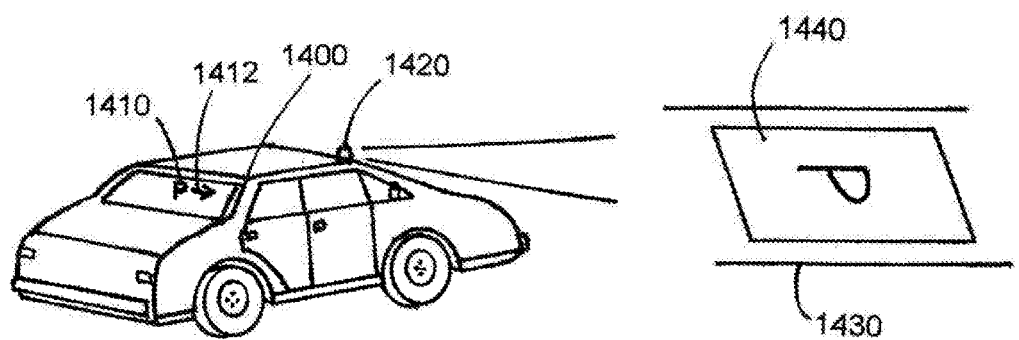
FIG. 18
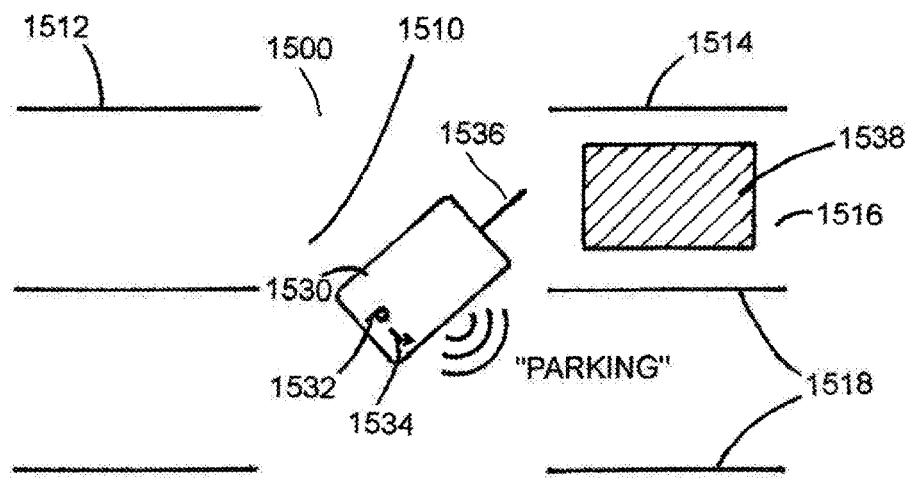
FIG. 19

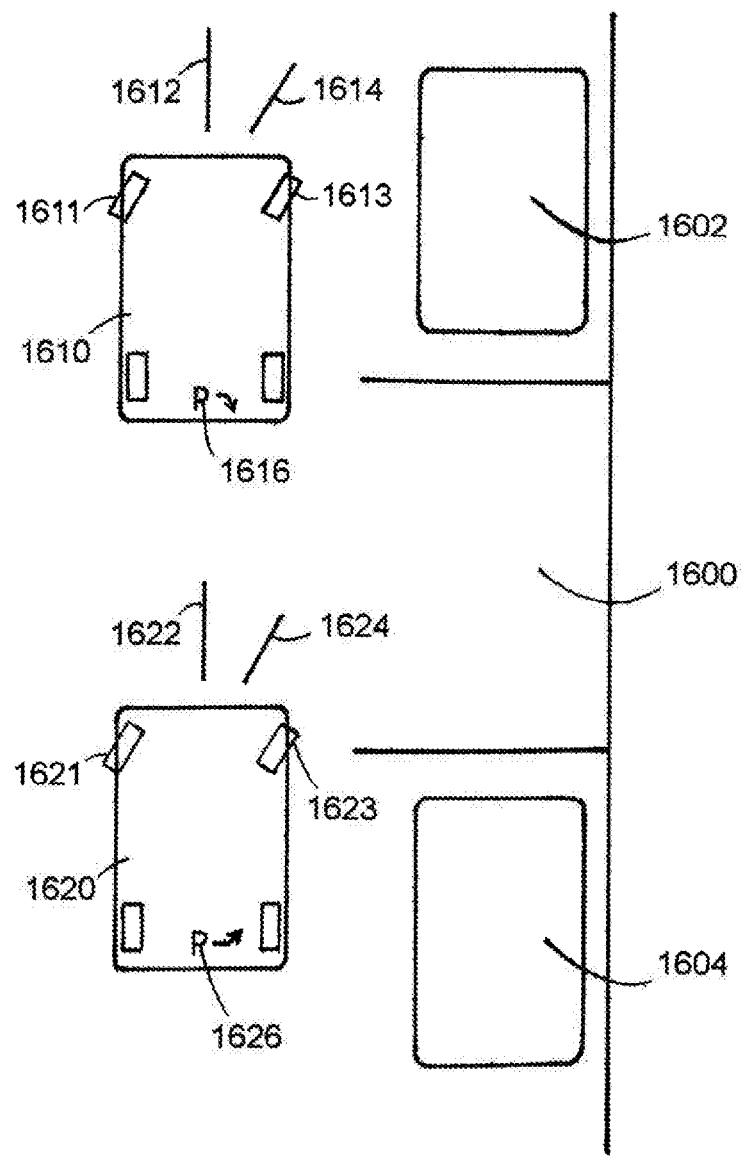
FIG.20

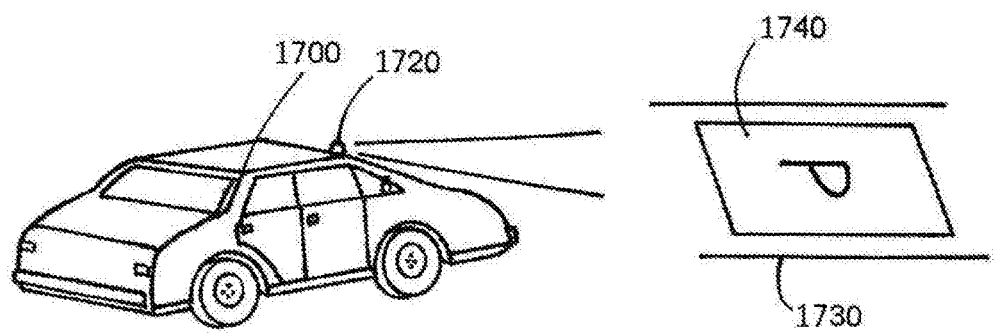
FIG. 21
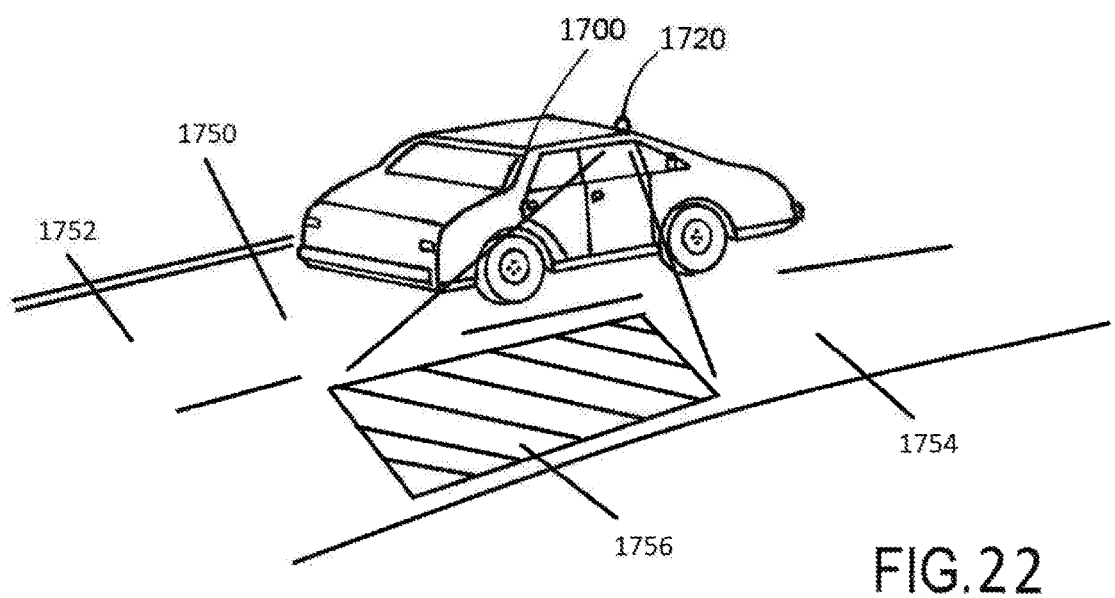
FIG. 22

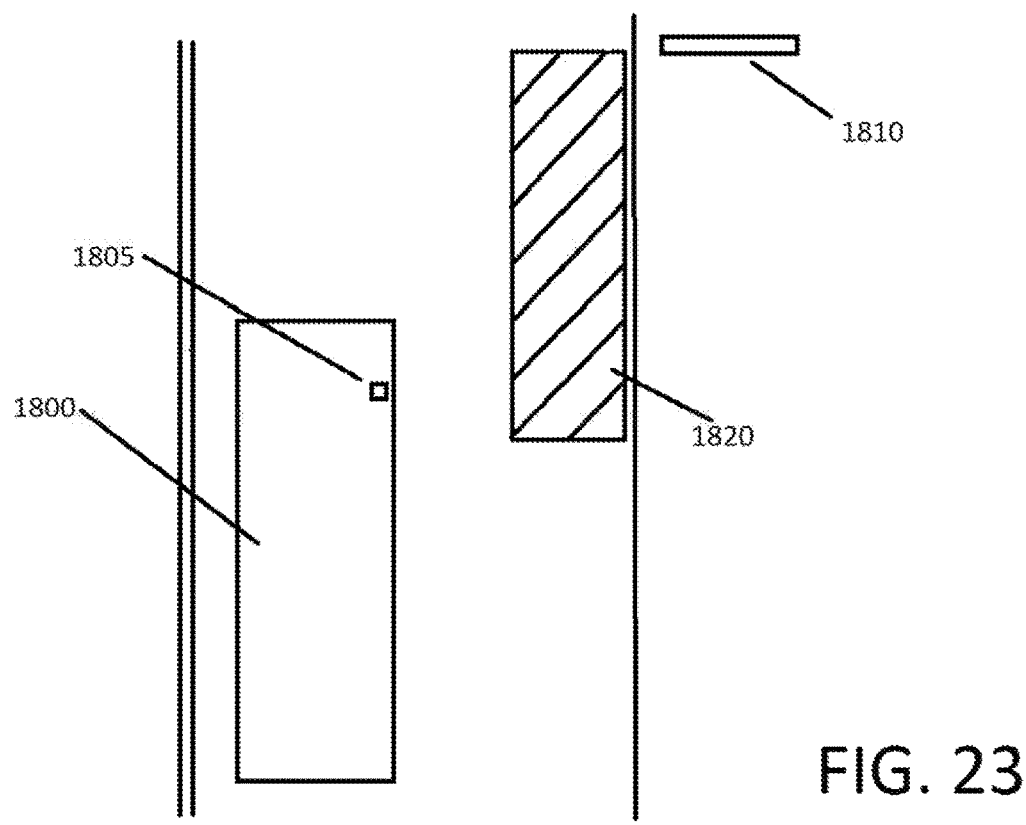
FIG. 23
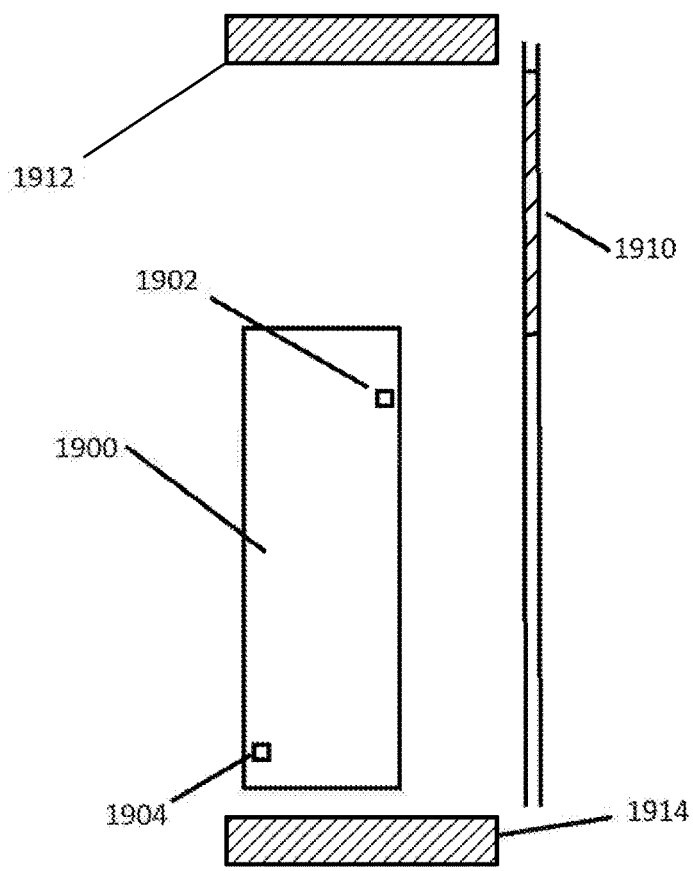
FIG. 24

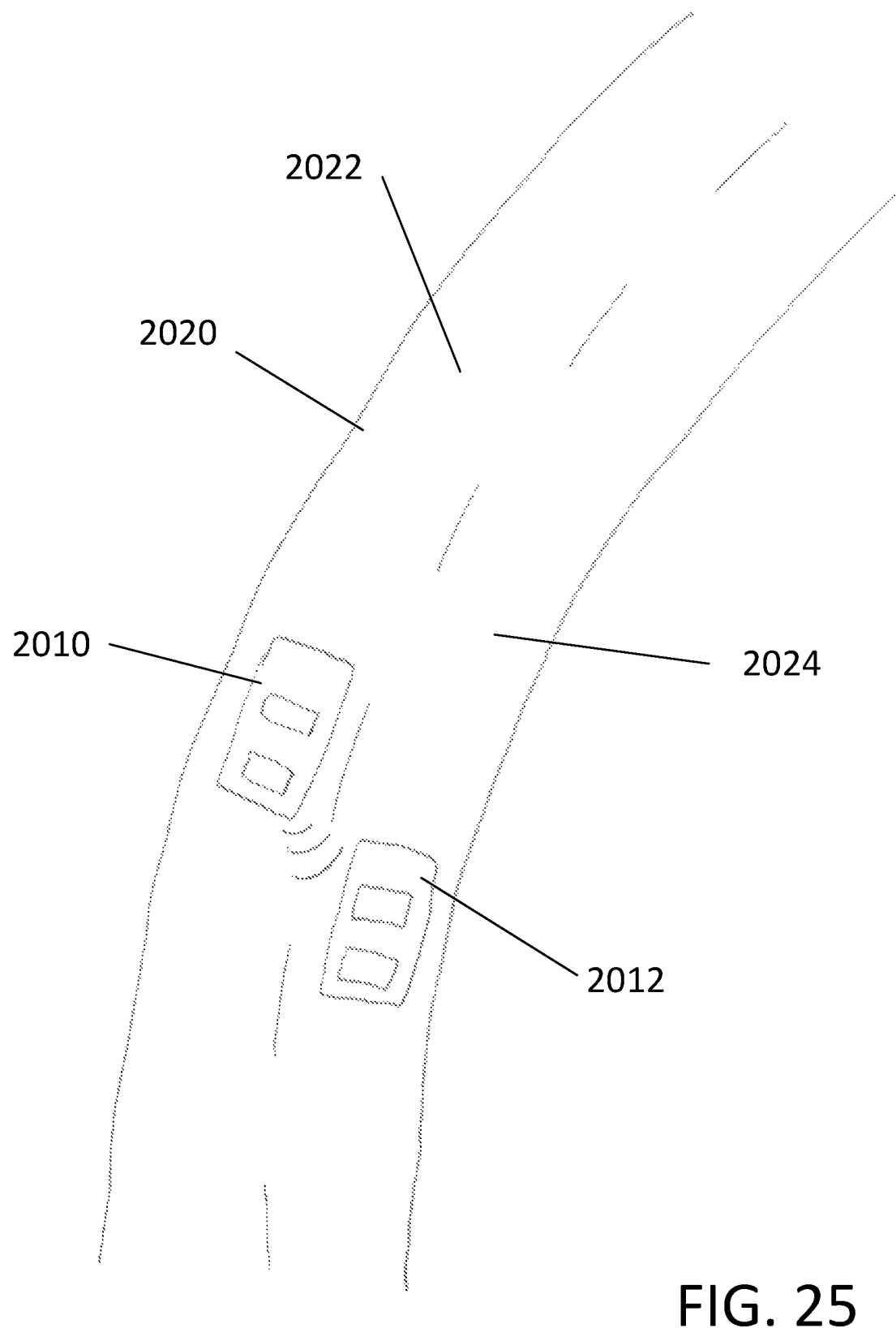
FIG. 25

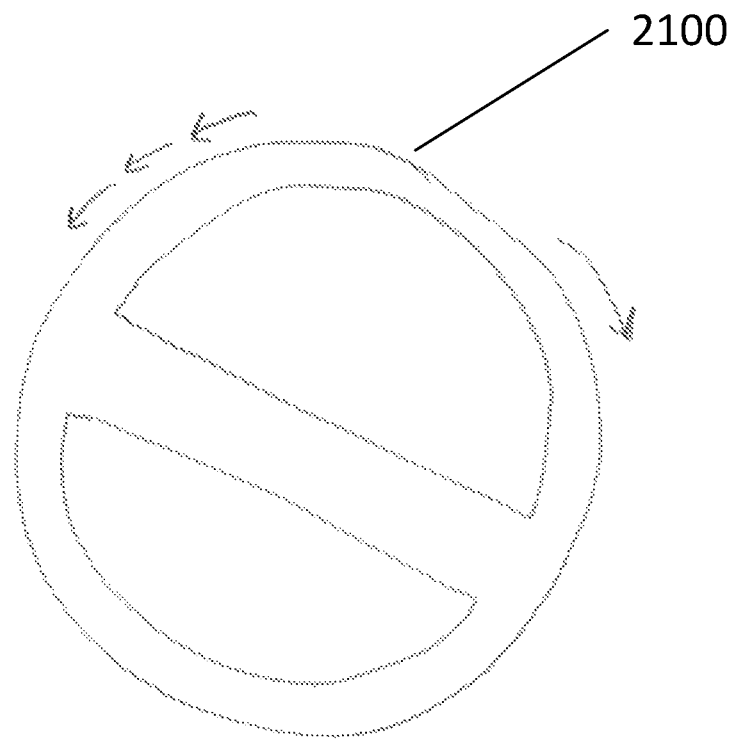
FIG. 26
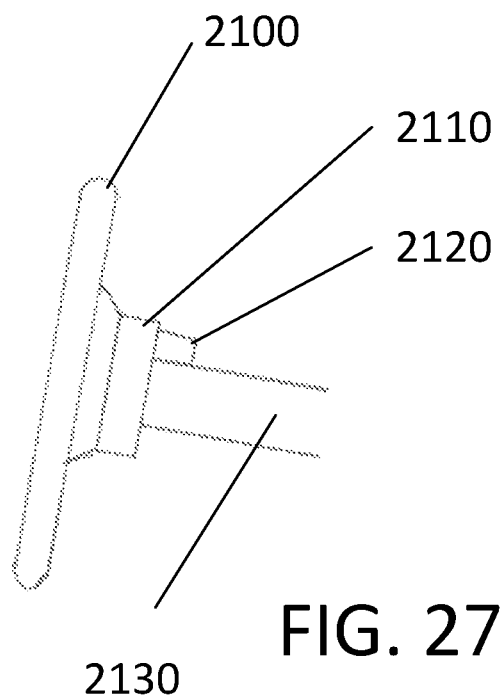
FIG. 27

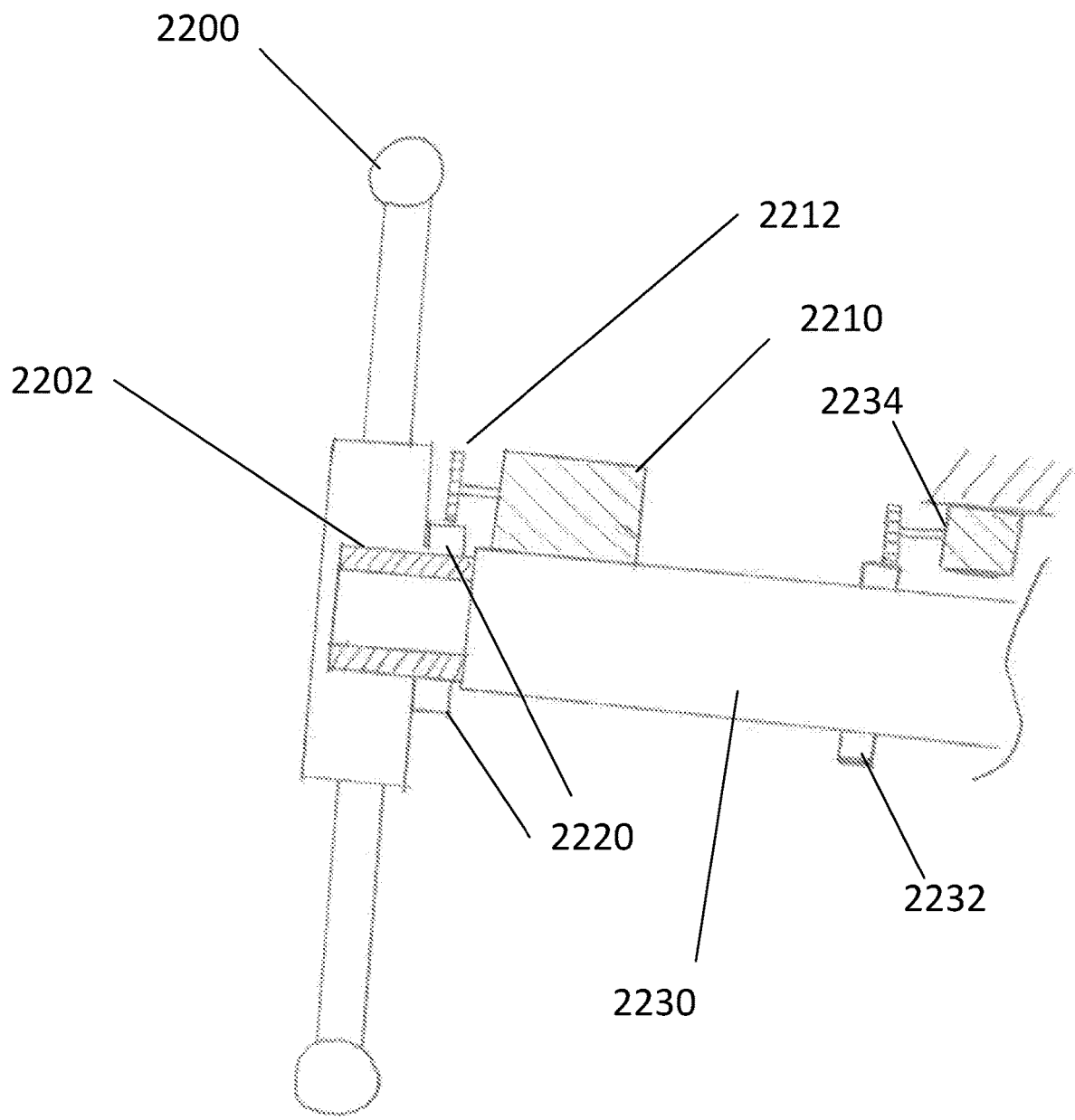
FIG. 28

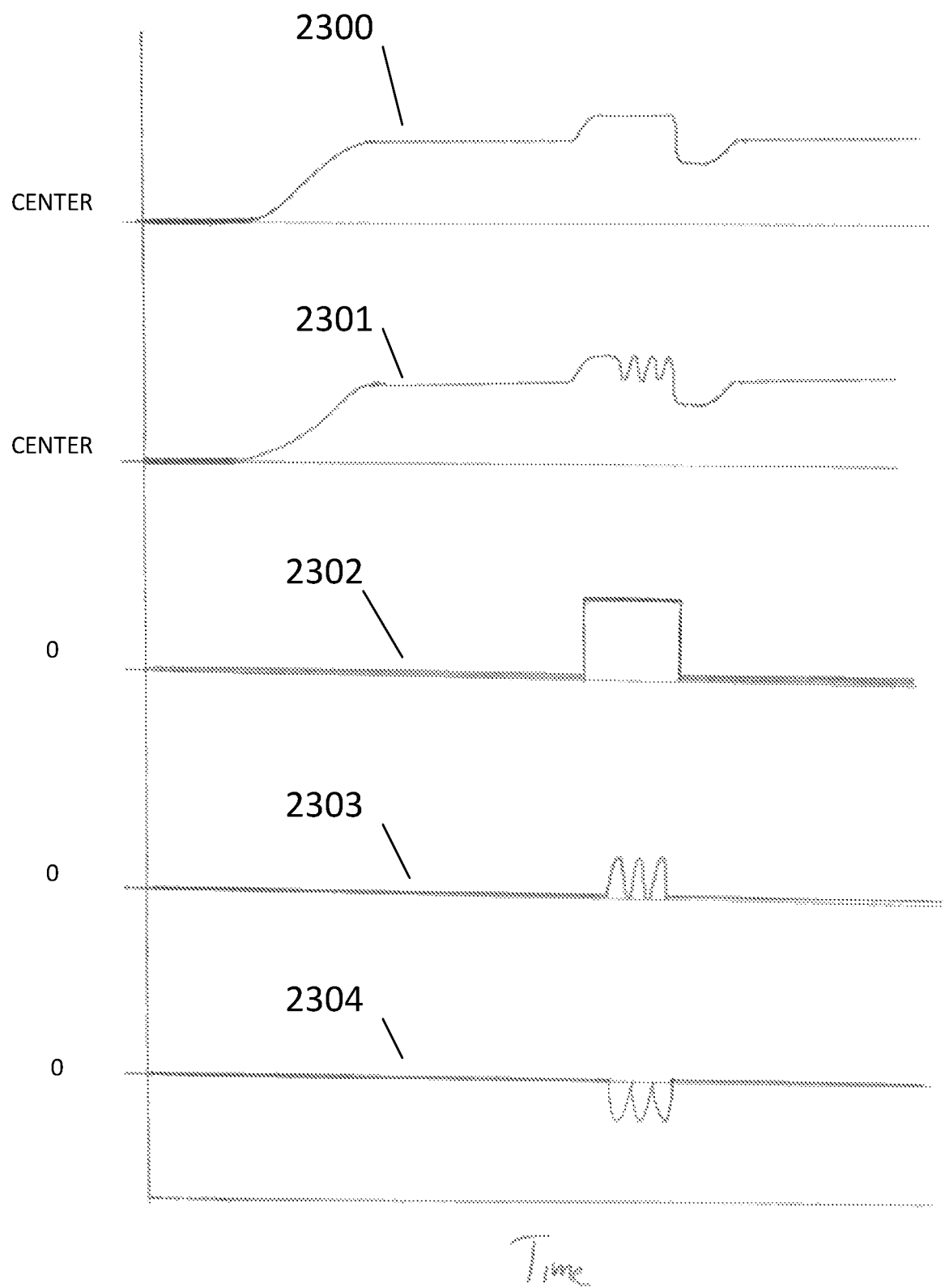
FIG. 29

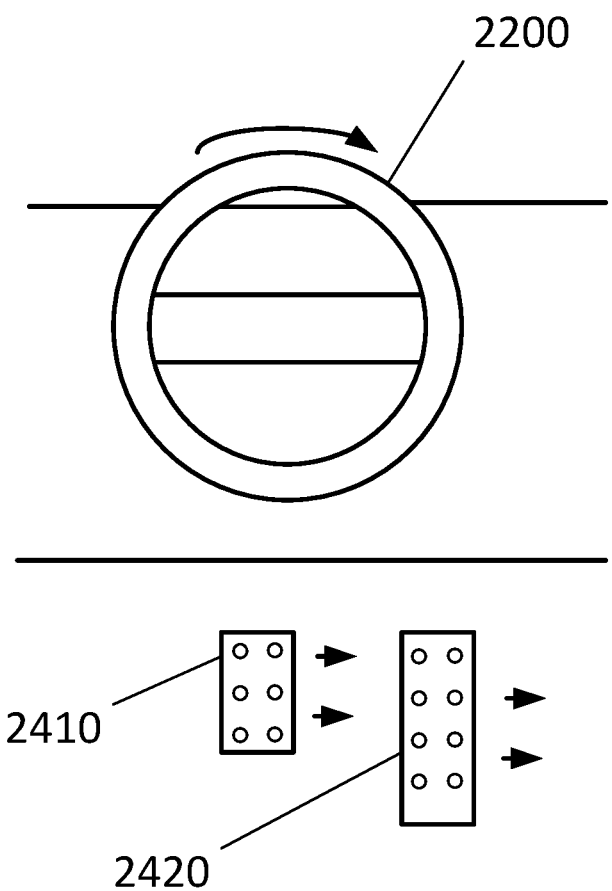
FIG. 30

000
VEHICLE DRIVER NUDGE SYSTEM

CROSS REFERENCE TO RELATED APPLICATIONS

This disclosure is a continuation-in-part of U.S. patent application Ser. No. 15/804,597 filed on Nov. 6, 2017 which is a continuation in part of U.S. patent application Ser. No. 15/096,776 filed on Apr. 12, 2016 which is a continuation of U.S. patent application Ser. No. 14/533,849 filed on Nov. 5, 2014 which claims the benefit of U.S. Provisional Application No. 61/900,459 filed on Nov. 6, 2013, all of which are hereby incorporated by reference.

TECHNICAL FIELD

This disclosure is related to a motor vehicle safety system useful to warn a driver of a inadvisable maneuver, in particular, providing a tactile signal through the steering wheel that a neighboring vehicle blocks an indicated desired lane change.

BACKGROUND

The statements in this section merely provide background information related to the present disclosure. Accordingly, such statements are not intended to constitute an admission of prior art.

Parallel parking is a method of parking a vehicle in line with other parked cars at the edge of a road or street; parallel to the curb at the edge of a road. Often this is between two other parked vehicles and as this is more difficult to do than angled parking, It often causes great difficulty for many drivers, especially when there are no other parking options other than to parallel park. This is common in downtown areas and in large metropolitan areas. In the best of circumstances parallel parking is among one of the hardest challenges drivers face. Often a driver will circle a block until a space becomes available, and then attempt to park in the newly available spot. When parking, the driver will pull up along side a parked vehicle in front of the space where he or she desires to park and then back into the desired parking space. Unfortunately; this maneuver is often performed in a high traffic area and as this driver is stopping, another vehicle stops just a few feet behind the vehicle that is attempting to park, blocking the pathway. This is despite the fact that the driver of the parking vehicle has turned on the right turn signal and placed the car into "reverse", which turns on the vehicles backup lights.

Traffic behind the car that is attempting to parallel park have no idea what is about to happen, as the combination of right turn signal and backup lights does not universally signal an intention to park.

Vehicle sensors can determine details of an operating environment close to a vehicle. Camera, radar, LIDAR, ultrasonic, and other sensor systems can be used in coordination with onboard computerized processors to determine a location and orientation of the vehicle in relation to a lane and in relation to neighboring vehicles.

Haptic warning systems within vehicles are known. Seats, steering wheels, and other surfaces can be made to vibrate to indicate certain messages or warnings to the driver.

SUMMARY

A driver nudge system is operated within a vehicle to indicate a warning to a driver of the vehicle. The system includes a steering wheel, a vehicle sensor monitoring an operating environment of the vehicle, and an electric motor connected to the steering wheel configured to nudge the steering wheel in an opposite direction to a threat diagnosed according to data from the vehicle sensor.

BRIEF DESCRIPTION OF THE DRAWINGS

One or more embodiments will now be described, by way of example, with reference to the accompanying drawings, in which:

FIGS. 1A-1C illustrate a vehicle attempting a parallel parking maneuver utilizing prior art, in accordance with the present disclosure;

FIG. 1A illustrates the vehicle driving along a road and approaching a parking space;

FIG. 1B illustrates the vehicle pulling past the parking space in preparation for a parallel parking maneuver; and FIG. 1C illustrates other vehicles pulling behind the vehicle and unintentionally block the intended parallel parking maneuver;

FIGS. 2A-2C illustrate a vehicle executing a parallel parking maneuver utilizing a parking assist light (PAL) system, in accordance with the present disclosure;

FIG. 2A illustrates the vehicle approaching a parking space and activating the PAL system;

FIG. 2B illustrates the vehicle pulling past the parking space in preparation for the parking maneuver and the next vehicle, the driver being informed of the desired maneuver by the PAL system, leaving space for the parking vehicle to execute the maneuver; and FIG. 2C illustrates the vehicle completing the parallel parking maneuver, in accordance with the present disclosure;

FIG. 3 illustrates an exemplary PAL system light bar, in accordance with the present disclosure;

FIG. 4 illustrates exemplary control buttons enabling activation of the PAL system and corresponding light signals, in accordance with the present disclosure;

FIG. 5 is a schematic illustrating exemplary components of a PAL module including a microprocessor configured to operate computerized functions related to the PAL system, in accordance with the present disclosure;

FIG. 6 is a flowchart illustrating an exemplary process for using a PAL system, in accordance with the present disclosure;

FIGS. 7A-7D illustrate another exemplary embodiment of a PAL system light bar, utilizing portions of an arrow to indicate to a desired parking maneuver both to the left or right of the vehicle and to the front or rearward of the vehicle, in accordance with the present disclosure;

FIG. 8 illustrates a vehicle including an aftermarket PAL system light bar displayed in a rear window of the vehicle, in accordance with the present disclosure;

FIG. 9 illustrates the aftermarket PAL system light bar of FIG. 8, in accordance with the present disclosure;

FIG. 10 illustrates an exemplary PAL system light bar including a matrix of lights and configured to additionally act as a brake light, in accordance with the present disclosure;

FIGS. 11A-11C illustrate operation of an exemplary PAL system light bar including a matrix of lights and indicating through a series of display images both operation of a braking function and intention to execute a parallel parking maneuver, in accordance with the present disclosure;

FIG. 12 illustrates an exemplary turn signal including PAL indicator lights incorporated therewith, in accordance with the present disclosure;

FIG. 13 illustrates a headlamp device of a vehicle including PAL indicator lights incorporated therewith, in accordance with the present disclosure;

FIG. 14 illustrates exemplary controls enabling a driver to control the PAL system installed to an instrument panel of a vehicle, in accordance with the present disclosure;

FIG. 15 illustrates an exemplary vehicle equipped with the PAL system providing an audio warning to a pedestrian walking proximately to the vehicle, in accordance with the present disclosure;

FIG. 16 illustrates an exemplary vehicle equipped with the PAL system situated between two open parking spaces and operation of the PAL system to determine a driver's intent to park in one of the spaces, in accordance with the present disclosure;

FIG. 17 illustrates a vehicle equipped with the PAL system evaluating a parking space as a candidate for a parallel parking maneuver, in accordance with the present disclosure;

FIG. 18 illustrates an exemplary vehicle equipped with the PAL system using a laser to project a pattern and visually designate a parking space in which it is about to park, in accordance with the present disclosure;

FIG. 19 illustrates an exemplary vehicle equipped with the PAL system automatically entering a parking mode based upon behavior of the vehicle in relation to parking spaces in a parking lot, in accordance with the present disclosure;

FIG. 20 illustrates exemplary vehicles equipped with the PAL system automatically entering a parking mode based upon behavior of the vehicle in relation to an open parking space along a side of the roadway, in accordance with the present disclosure;

FIG. 21 illustrates an exemplary vehicle equipped a laser projector to project a pattern and visually designate a parking space in which it is about to park, in accordance with the present disclosure;

FIG. 22 illustrates the vehicle of FIG. 21 projecting a pattern and visually designating an impending lane change upon a road surface, in accordance with the present disclosure;

FIG. 23 illustrates an exemplary bus vehicle equipped a laser projector to project a pattern and visually designate a bus stop in which it is about to stop, in accordance with the present disclosure;

FIG. 24 illustrates an exemplary school bus vehicle equipped a laser projector to project a pattern and visually designate a bus stop in which it is about to stop and project lines for other vehicle to stop in observance of school bus stop traffic laws, in accordance with the present disclosure;

FIG. 25 illustrates an exemplary vehicle upon a road surface, including sensors monitoring an operating environment of the vehicle, wherein the vehicle is equipped with a driver nudge system useful to warn a driver of the vehicle of a neighboring vehicle blocking an intended lane change, in accordance with the present disclosure;

FIG. 26 illustrates a steering wheel of the vehicle of FIG. 25, wherein a driver is applying a clockwise force consistent with an intended lane change to the right and wherein the vehicle nudge system, sensing a neighboring vehicle blocking the intended lane change, provides an exemplary three nudges to the steering wheel in the counter-clockwise direction, in accordance with the present disclosure;

FIG. 27 illustrates the steering wheel of FIG. 26 in side view, illustrating exemplary details useful to generate a nudge to the steering wheel in either of a clockwise or counter-clockwise direction, in accordance with the present disclosure;

FIG. 28 illustrates in sectional view exemplary details of a steering wheel that can be used to generate a nudge to the driver in either a clockwise or counter-clockwise direction, including a steering column stabilizer useful to filter movement from the nudge from control input to the steering column, in accordance with the present disclosure;

FIG. 29 illustrates through a plurality of exemplary data plots operation of a driver nudge system, in accordance with the present disclosure; and FIG. 30 illustrates an alternative embodiment of the driver nudge system, utilizing nudge outputs additionally or alternatively to the pedals of the vehicle, in accordance with the present disclosure.

DETAILED DESCRIPTION

Signals between drivers of vehicles avoid confusion. Sometimes, cooperation by one driver is required for a second driver to achieve a desired maneuver in traffic. A turn signal can be used to signal between drivers an intention to change lanes. Such a signal can cause a driver in the desired lane to make room for the desired maneuver. Without the signal, the driver wanting to change lanes would simply need to wait until the surrounding traffic pattern happened to permit the desired maneuver.

Similarly, a maneuver to parallel park by one driver can require cooperation from a second driver. Referring now to the drawings, wherein the showings are for the purpose of illustrating certain exemplary embodiments only and not for the purpose of limiting the same, FIGS. 1A-1C illustrate a parallel parking attempt utilizing upon prior art. FIG. 1A illustrates a vehicle 10 driving down a road 28. On the far right side is a curb 24 and on the far left is the traffic diving line 26. Parked next to curb 24 are parked vehicles 11, 12, 13, 14, and 15. An open parking space 22 is available.

FIG. 1B illustrates vehicle 10 driving past space 22 in preparation for beginning a parallel parking maneuver into space 22. Vehicle 10 may use a turning signal known in the art to indicate the desire to parallel park. However, a turning signal can indicate a number of maneuvers to other drivers. A turning signal could indicate a desire to turn at a next stop light or to double park next to vehicle 12. As a result of this lack of communicated intent, vehicle 34 in traffic pulls up behind vehicle 10. The driver of vehicle 10 may hand signal or wait in hopes of vehicle 34 backing up and making room for the parallel parking maneuver, but the driver of vehicle 34 may have no clear indication of the intentions of the driver of vehicle 10.

FIG. 1C illustrates vehicle 10 waiting for the driver of vehicle 34 to make room for vehicle 10 to execute the parallel parking maneuver. Vehicles 35 and 36 are illustrated pulling up behind vehicle 34. Once traffic is backed up behind vehicle 10, no possibility exists to efficiently make room for the desired parallel parking maneuver. The driver of vehicle 10 has no choice but to abandon the open parking space 22.

A parking assist light (PAL) system is disclosed communicating a desire by a driver of a vehicle to parallel park. According to one embodiment, the PAL system can include a parallel parking light bar is a light bar that is mounted at the rear of a vehicle. It can be either a removable aftermarket light bar, or a permanent original equipment manufacturer (OEM) light bar that is built into the vehicle. While the housing of the light can be chrome and automotive grade sealed polycarbonate plastic, other materials such as aluminum or steel are also suitable. The lights can be either incandescent, LED, or any other light emitting device known in the art. A portable or aftermarket version can be battery powered and activated by a dashboard mounted remote control via infrared light or low-powered radio signal. An OEM version can be hard-wired. In one embodiment, the portable system can be plugged into a vehicle's electrical system via a cigarette lighter or another method.

The PAL system is an innovative audio and visual lighting system that alerts drivers and pedestrians of a drivers intention to park. Every day hundreds of motorist weave their way through chaotic city streets. Once the driver reaches their destination they will need to park their car. This is fine and poses not challenge when parking in the driveway or garage. There is no one there, parking is easily accessible and it is the perfect space. This is not the case when parking on a busy street or in a congested parking lot. A lot of people are blissfully unaware of the dangers the act of parking a car poses to drivers and pedestrians alike.

People lack parking sense and parallel parking is not something that most people do flawlessly As a matter of fact 21% of drivers avoid parallel parking whenever possible and another 10% of drivers avoid parallel parking altogether. Often the main culprit for driver anxiety is traffic. Drivers can be discourteous to people attempting to park. A driver often feels pressured to park quickly when there are others behind them. If the task seems to be to arduous or time consuming the driver will circle to block or look for another space. If the driver decides to attempt to park in a space they may find that there is not enough space left between them and the car behind them to attempt to park into the space. 58% of motorists admit to giving up and driving off if they are unable to maneuver into a space due to traffic congestion. On average drivers will spend an average of four minutes attempting to get into a space before giving up. Parallel parking also lends to the perfect conditions for traffic incidents.

The following are the most common causes of crashes due to parallel parking: vehicle parked in roadway, vehicle leaving/entering parking space, passenger exiting/entering parked vehicle, reduced sight distance for vehicles and pedestrians (especially near intersections), While specific statistics focused on the number of pedestrian vs. vehicle and motorcyclist/bicyclist vs. vehicle in relation to parallel parking are not available there are numerous stories relating the dangers. In March of this year a 77 year old women was reportedly struck and killed by a driver in the midst of parallel parking. Marlene Baharlias, 77, was jaywalking when she stepped off a curb mid-block between and was struck by a man as he pulled forward to parallel park. Unfortunately the driver was unable to see Marlene Baharlias between two parked cars due to the reduced visibility common to parallel parking.

Believe it or not parking lots are even more treacherous and difficult to navigate. When most people get out of their vehicle in a parking lot, they don't think twice about walking down the aisles and then heading toward a store. The problem is, though, drivers aren't always so careful. Parking lots are one of the likeliest places for fender benders to occur because individuals are the least concentrated on driving and more focused on finding a parking space. There are actually quite a few pedestrian parking lot accidents that result in serious injury or even death.

Most people feel a false sense of security in a parking lot because drivers tend to go more slowly, but that doesn't mean anyone is safe. There is always a chance of an accident. Beyond that, pedestrians must walk over payment be undamaged or unkempt. As a result, trips and falls could be common. One slip and fall could result in serious injury.

Parking lot accidents can vary depending on the situation, and that means the causes can vary as well. Some of the most common causes of accidents that resulted in pedestrian injury include:

Congestion in parking lots causes accidents. When parking lots are busy and crowded, it is harder to maneuver.

Vehicles backing out without looking cause accidents. Drivers cannot always see if someone is walking behind them.

Gaps in traffic laws or poor enforcement cause accidents. Traffic laws like stop signs are unenforceable in private parking lots.

Drivers too focused on finding a good parking space cause accidents. When drivers get too distracted worrying about finding a space, they may not notice pedestrians.

All-in-all, pedestrian accidents in parking lots occur because someone is just not paying attention. Just because the cars are going very slowly, people assume the injuries may not be that bad. However, that isn't necessarily the case. Injuries can be severe or even fatal.

According to studies, statistics show that parking lot accidents can be very dangerous. The following statistics are provided: 99 fatalities and 2,000 injuries occurred from cars backing out of parking spaces in one year and 106 fatalities and 5,000 injuries occurred to pedestrians from vehicles that were moving forward in parking lots. Most people cannot even imagine a parking lot accident being fatal, but they can be. Cars are still very large and very heavy even going at a slower rate of speed. When a pedestrian is hit, they can still suffer fatal injuries.

Prior to parking, be it curbside or in a parking lot, the user will be able to signal to other cars that they are parking as well as provide directional information. This is made possible by the use of LED lights within the headlights and taillights. Upon activating the PAL Systems LED lights will light up sequentially ending in an arc or arrow indicating which direction the user will be cutting their wheels. In conjunction with the parking light indicator there will be an external audible buzzer/chime that will sound in unison with the lighting sequence. The light sequence and the external buzzer/chime will be work in a similar fashion to the reverse warning beeps used in large trucks. The system could be activated by a button placed on the dashboard/steering wheel/touchscreen entertainment system.

The addition of visual stimulation in the form of LED lights showing a clear directionality will alert drivers and pedestrians in front of the driver as well as behind the driver that they should stay clear and allow enough space for the driver to park safely. The addition of the audio stimulation in the form of beeping will alert pedestrians who are unable to view the LED lighting that someone near them is attempting to park giving them the time necessary to adjust their trajectory. The main purpose of this disclosed system is saving lives while streamlining traffic.

FIGS. 2A-2C illustrate exemplary operation of an embodiment of the PAL system and corresponding facilitation of parallel parking. FIG. 2A illustrates a vehicle 310 driving down a road 328, wherein the vehicle is improved with the disclosed PAL system. On the far right side is a curb 324 and on the far left is the traffic diving line 326. Parked next to curb 324 are parked vehicles 311, 312, 313, 314, and 315. An open parking space 322 is available. PAL indicator 305 is activated indicating to vehicle 334 that a parallel parking maneuver is imminently intended.

FIG. 2B illustrates vehicle 310 advancing past space 322 in preparation to execute a parking maneuver. Because the PAL indicator has been activated, the driver of vehicle 334 can be clearly made aware of the intended maneuver. Vehicle 334 stops behind space 322, such that vehicle 310 has adequate room to park in space 322.

FIG. 2C illustrates a vehicle 310 executing a parallel parking maneuver. Vehicle 335 and other traffic can back up behind vehicle 334. However, because the driver of vehicle 334 understood the intentions of the driver of vehicle 310, traffic does not get in the way of vehicle 310 executing the desired maneuver. In this way, the PAL system enables efficient parallel parking.

A PAL system light indicator can take many different forms. FIG. 3 illustrates one exemplary light indicator that can be utilized with the PAL system. A parking light bar 20 is illustrated, with a white light 52 in the center. While light 52 is illustrated as a single light, this can also be a grid of lights. In one embodiment, white light 52 is a square grid instead of either a single light or a grid pattern. White light 52, in one embodiment, can be tied to a reverse gear in the vehicle, drawing more attention to the vehicle backing up during a parking maneuver. In another embodiment, white light 52 can be used to indicate activation of the parking mode. White light 52 could be activated as a steady light, could pulsate, strobe, or be illuminated with any pattern that can be used to get attention and/or indicate a desire to park to a viewer. An optional display 58 indicating "PARALLEL" is illustrated as an exemplary selectably illuminated display, aiding other drivers in distinguishing the PAL indicator and parking mode from other indications such as an ordinary turn signal.

On either side of white light 52 are red lights 54. While depicted as a single light, this can also be a grid of lights arrayed in a number of patterns. In one embodiment, red light 54 can include a grid pattern of smaller lights. Arrows 55 and 56 can be used to indicate a desire to parallel park into a spot on either the left side or right side, respectively, of the vehicle. Arrows 55 and 56 are in addition to turn signals additionally situated upon the vehicle, such that a driver of another vehicle can clearly distinguish between a normal turn signal indication and a signal that a parallel parking maneuver is desired.

A PAL system can be installed at the factory by a car manufacturer. In such an instance, parking light bar 20 can be a "dumb" system, with lights simply receiving electrical current based upon control by a remote module or computerized system within the vehicle. In another embodiment, the PAL system can be retrofitted to a vehicle that did not originally include the PAL system. In such an instance, parking light bar 20 can be a "smart" system, including a computerized processor capable of monitoring inputs, determining a parking indication to be made based upon the monitored inputs, and controlling lights and/or audio indicators in the bar and throughout the vehicle based upon the determined parking indication to be made.

According to one control process for the PAL system, a driver of the equipped vehicle activates a desire to parallel park button. At that point, light 52 and display 58 are illuminated, indicating to other drivers that a parking maneuver is desired but not imminent. Once a parking space is spotted, the driver can indicate that either a parking maneuver to the right or to the left is desired, and the corresponding arrow 55 or 56 is illuminated, signaling to other drivers that a parking maneuver into a proximate spot is imminent.

Another exemplary embodiment of a PAL system parallel parking light bar can include an onboard microcomputer coupled with a street-map database, GPS, radar, and a display screen. Such a system can still be manually operated exactly as the more basic version, it differs in that it also has a display screen mounted on the dash and an input system to initiate a "search and find" mode. When a driver decides that he or she wishes to parallel park, he or she activates the PAL system parallel parking system's "search and find" mode, initiating a parking space search. The PAL system parallel parking uses its onboard mapping database and a radar to scan the streets ahead. The GPS allows it to know its location and the database to know where all of the legal parking spaces are located. Radar or light detection and ranging (LIDAR) then determines if each parking space is vacant or currently being occupied by another vehicle. When an available space is located, the dash mounted system signals the driver. In one embodiment, instead of radar or LIDAR, a camera equipped vision system is used to locate a vacant parking space.

In one embodiment, after signaling the driver that a space is available, the computerized processor can automatically turns on the rear-facing PAL system parallel parking light bar. Even if the driver later rejects this proposed space as too small or difficult to parallel park into and turns off the rear lights, the light activation has alerted traffic behind the driver that this vehicle is attempting to park and will likely make future stops when a space is found.

In one embodiment, when the PAL system parallel parking light bar is activated, an audio signal can accompany visual signals indicating to any surrounding pedestrians or bicyclists that a parallel parking maneuver is in process. In another embodiment, vehicle to vehicle communication, for example, by wireless communication, can enable a parking mode or active parking maneuver in one vehicle to be alerted within nearby vehicles.

It will be understood that the PAL system is intended to be complementary to turn signal lights. PAL system lights can be operated independently of turn signal lights. In another embodiment, the PAL system lights and the turn signal lights can be used together during a parking maneuver, for example, with the PAL lights and turn signal lights blinking in unison or blinking alternatingly to draw attention to the desired maneuver.

FIG. 4 illustrates exemplary steering wheel controls enabling a driver to control the PAL system. Steering wheel 110 is illustrated including turn signal handle 120 and PAL system control buttons 130, 132, and 134. Button 130 is configured to initiate or cancel a parking mode. An exemplary parking mode indicator light displaying "Parallel," "Parking," or "P" can be lit based upon activation of the parking mode. The driver can then hit either button 132 to indicate a desired parking maneuver to the left or button 134 to indicate a desired parking maneuver to the right, and the respective arrow lights can be activated based upon the button activations. Parking mode and/or activation of the arrow lights can be automatically canceled, for example, by the vehicle stopping near a parking space and then accelerating away from the spot, indicating an aborted parallel parking attempt.

Activation of the parking mode or of arrow lights indicating to a parking space can include visual or audio feedback to the driver. For example, FIG. 4 illustrates instrument panel lights 140 including a "P" within a circle indicating activation of parking mode and 142 including a left and right arrow indicating activation of arrow lights indicating a direction of an imminent parking maneuver. In addition or in the alternative, an audio signal or message can remind the driver that the PAL system is operational.

The steering wheel controls of FIG. 4 are illustrative of controls that can be used to provide a user interface to the PAL system. Other embodiments include buttons located on the instrument panel, inputs to a touch screen device installed to the vehicle, voice command inputs, inputs to a portable computerized device such as a smart phone in communication (e.g. Bluetooth communication) with the vehicle, or an aftermarket button pack adhered to the instrument panel or windscreen and in wireless communication with an aftermarket installed PAL light bar.

FIG. 5 illustrates an exemplary control module operating the disclosed PAL system including a computerized processor. PAL module 30 can include processing device 200 configured to operate computerized programming. In the illustrative embodiment illustrating optional features of the PAL system, PAL module 30 includes a processing device 200, a user interface 202, a street map and parking space database 203, communication device 204, a memory device 206, a global positioning system (GPS) 207, a camera system 208, a radar system 209, and a LIDAR system 215. It is noted that the PAL module 30 can include other components, some of the components are not required in all embodiments, and a simplified version of the control module can be operated, for example, including button switch inputs and a relay device providing for blinking of connected lights.

The processing device 200 can include memory, e.g., read only memory (ROM) and random access memory (RAM), storing processor-executable instructions and one or more processors that execute the processor-executable instructions. In embodiments where the processing device 200 includes two or more processors, the processors can operate in a parallel or distributed manner. The processing device 200 can execute the operating system of the PAL module 30. In the illustrative embodiment, the processing device 200 also executes a location determination module 210 and a radar, LIDAR, and video-processing module 213, which are described in greater detail below. Processing device 200, utilizing modules 210 and 213, can operate programming to monitor inputs by the user; monitor environmental conditions around the vehicle such as the geometric relationship of the vehicle to an open parking space; determine a parking intention of the driver; and activate PAL system indication lights, audio outputs, and vehicle to vehicle or vehicle to infrastructure communications to communicate an intention to parallel park to drivers around the vehicle.

The user interface 202 is a device that allows a user to interact with the PAL module 30. While one user interface 202 is shown, the term "user interface" can include, but is not limited to, a touch screen, a physical keyboard, a mouse, a microphone, and/or a speaker. The street map and parking space database 203 stores street maps and parking space locations. It is used by the PAL module 30 along with GPS device 207 to find known parking spaces. A municipality could operate cameras or other devices and a computerized processor to provide a current status for known parking spaces in an area. The communication device 204 is a device that allows the PAL module 30 to communicate with another device, such as a remote server, to update database 203 with current information on parking spaces.

The communication device 204, in PAL system embodiments utilizing an exemplary wireless control system in communication with a wireless PAL light bar, can include one or more wireless transceivers for performing wireless communication and/or one or more communication ports for performing wired communication. In another embodiment, communications device 204 can be replaced or augmented by an electrical harness connection to vehicle systems and/or a PAL light bar.

The memory device 206 is a device that stores data generated or received by the PAL module 30. The memory device 206 can include, but is not limited to, a hard disc drive, an optical disc drive, and/or a flash memory drive.

The GPS 207 determines a location of the PAL module 30 by communicating with a plurality of GPS satellites. The GPS 207 can perform known triangulation techniques to determine the GPS coordinates of the PAL module 30. It should be appreciated that while a GPS 207 is shown, any other suitable component for determining the location of the vehicle such as cell phone tower triangulation can be implemented.

The camera vision system 208 is a digital video camera that captures a series of digital photographs. The camera is aimed at parked vehicles ahead and uses computerized vision recognition software to determine if a photographed parking space is occupied or not. The digital photograph can be a bitmap, a JPEG, a GIF, or any other suitably formatted file. These photographs can be a rapid series of still photos or captured photographs from a video camera. The camera can receive the instruction to capture images from the processing device 200 and can output the digital photographs or video to the processing device 200. By doing so, the camera system can determine if a vehicle is present or not in an approaching parking space, determine distances to objects or between objects, and can provide information useful to parking.

The radar system 209 omits a radio signal and then receives this same signal back after it is reflected back to it. By doing so, the radar can determine if a vehicle is present or not in an approaching parking space, determine distances to objects or between objects, and can provide information useful to parking.

The LIDAR system 215 omits laser light and then analyzes light that is reflected back to it. By doing so, the LIDAR can determine if a vehicle is present or not in an approaching parking space. By doing so, the LIDAR can determine if a vehicle is present or not in an approaching parking space, determine distances to objects or between objects, and can provide information useful to parking.

The location determination module 210 uses data from the GPS 207 and street map and parking space database 203 to calculate where the vehicle is in relation to known parking spaces.

The radar, LIDAR, and video processing device 213 uses any information from systems 208, 209, and 215 to determine a status and optionally a size of available space in a parking space. Combined with the location determination module 210, the processing device can then signal the driver that an available space has been located.

FIG. 6 illustrates a flowchart 250 for exemplary processes for a driver indicate to those behind that he or she is attempting to parallel park. Embodiments in accordance with the present disclosure can include non-limiting examples of a light bar, LED lights, and a microprocessor, or any other similar computerized device capable of operating the processes disclosed herein.

Flowchart 250 begins at step 252. At step 254, the user initiates a search for a parallel parking space. At step 256, the user decides if he or she prefers to conduct this search manually, with just his or her eyes, or to have the PAL system parallel parking indicator to use its ability to assist. If the decision is to do so un-aided, then during step 270, the driver actively searches for a suitable parallel parking space. Step 272 is actually locating a suitable parallel parking space. The next step, 273, is to physically activate the PAL system parallel parking light bar, signaling to those behind that this vehicle is about to backup and parallel park If the driver instead chooses to use the search function of the PAL system parallel parking indicator, he or she next initiates step 258, turning the active search feature on. During step 260, the PAL system parallel parking indicator is actively searching for a suitable space by using Radar, LIDAR, or a camera vision system, in conjunction with the onboard GPS. The next step is 262, when a suitable space is located, and a signal is sent to the driver. The system then advances to step 264, sending an audible voice command signal to the driver that a space has been found. The actually signaling to those following is step 266, when the PAL system parallel parking indicator is automatically turned on. At step s74, the driver begins to parallel park his or her vehicle, completing this maneuver at step 276. At step 278, the PAL system parallel parking indicator and the process is turned off and the process is completed.

The flowchart and block diagrams in the flow diagrams illustrate the architecture, functionality, and operation of possible implementations of systems, processes, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing device to function in a particular manner, such that the instructions stored in the computer-readable medium produce an article of manufacture including instruction means which implement the function/act specified in the flowchart and/or block diagram block or blocks. The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

FIGS. 7A-7D illustrate an alternative exemplary embodiment of a PAL system where an indication can be made in both a left and right direction and a forward and rear direction. Indication lights can be used to indicate whether the driver of a vehicle intends to park in a parking space in front of the vehicle or behind the vehicle. As illustrated in FIGS. 7A and 7C, a top half of an arrow can be used to indicate a parking intention to a parking space in front of the vehicle, and, as illustrated in FIGS. 7B and 7D, a bottom half of an arrow can be used to indicate a parking intention to a parking space behind the vehicle. In one embodiment, such controls can be manually set. In another embodiment, the relationship of the spot to the vehicle can be automatically determined by sensors and a processor. In another embodiment, the display can be made to automatically change as the vehicle moves in relation to the parking space.

FIG. 7A illustrates PAL light bar 400 including a central light 410, a parallel indicator 420, and a plurality of smaller lights 424 which combine to form indicator arrow 430. Indicator arrow 430 indicates to a left direction. Further a top half of the arrow point is lit while a bottom half of the arrow point is not lit. This configuration of arrow 430 can be used to indicate to an intention to parallel park to the left in a position in front of the vehicle. Central light 410 is not lit, which can be used to indicate either that the vehicle is not in a reverse gear or to selectively not alert other drivers of an imminent intent to back into a parking space.

FIG. 7B illustrates PAL light bar 400 including a central light 410, a parallel indicator 420, and a plurality of smaller lights which combine to form indicator arrow 440. Indicator arrow 440 indicates to a left direction. Further a bottom half of the arrow point is lit while a top half of the arrow point is not lit. This configuration of arrow 440 can be used to indicate to an intention to parallel park to the left in a position behind the vehicle. Central light 410 is lit, which can be used to indicate either that the vehicle is currently in a reverse gear or to selectively alert other drivers of an imminent intent to back into a parking space.

FIG. 7C illustrates PAL light bar 400 including a central light 410, a parallel indicator 420, and a plurality of smaller lights which combine to form indicator arrow 450. Indicator arrow 450 indicates to a right direction. Further a top half of the arrow point is lit while a bottom half of the arrow point is not lit. This configuration of arrow 450 can be used to indicate to an intention to parallel park to the right in a position in front of the vehicle. Central light 410 is not lit, which can be used to indicate either that the vehicle is not in a reverse gear or to selectively not alert other drivers of an imminent intent to back into a parking space.

FIG. 7D illustrates PAL light bar 400 including a central light 410, a parallel indicator 420, and a plurality of smaller lights which combine to form indicator arrow 460. Indicator arrow 460 indicates to a right direction. Further a bottom half of the arrow point is lit while a top half of the arrow point is not lit. This configuration of arrow 460 can be used to indicate to an intention to parallel park to the right in a position behind the vehicle. Central light 410 is lit, which can be used to indicate either that the vehicle is currently in a reverse gear or to selectively alert other drivers of an imminent intent to back into a parking space. It will be appreciated that the entire left or entire right arrow of the light bar of FIGS. 7A-7D can alternatively be utilized to simply provide a signal for a maneuver to the left or right, respectively.

FIG. 8 illustrates a vehicle with an aftermarket PAL light bar affixed to a rear sill of the rear window of the vehicle. Vehicle 500 is illustrated including turn signals 520 and 530. Additionally, PAL light bar 510 is illustrated affixed to the vehicle such that a driver in a vehicle behind vehicle 500 can be made aware of the parallel parking intentions of the driver of vehicle 500.

FIG. 9 illustrates the PAL light bar of FIG. 8 in detail. Light bar 510 includes parking indicator 540, left forward arrow 554, left rearward arrow 556, right forward arrow 550, and right rearward arrow 552. Indicator 540 can be selectively illuminated to communicate an intention to parallel park. Arrows 550, 552, 554, and 556 can be selectively illuminated to communicate and intention to a particular parking space or direction. Light bar 510 is affixed to window sill 560 with threaded fasteners 570 and 572. It will be appreciated that such an aftermarket device can be fastened to the vehicle with glue, magnets, suction cups, or any other similar attachment method known in the art. Exemplary light bar 510 includes wireless communication with an activation device situated to be available to the driver of the vehicle.

FIG. 10 illustrates an exemplary PAL light bar configured to additionally serve as a brake light. Some countries require vehicles to have a rearward-facing brake light, for example, located in a top middle of the rear window of the vehicle. Light bar 600 includes a matrix of individually controlled lights 602 which can be selectively lit. The exemplary light bar 600 includes ten vertically oriented columns and five horizontally oriented rows of lights, although any pattern of lights capable of indicating the intention of the driver can be used. Light bar 600 can selectively light all lights 602 to indicate braking or can selectively light a portion of lights to spell out the exemplary word "PARK" and an arrow pointing in a direction.

FIGS. 11A-11C illustrate an exemplary PAL light bar comprising a plurality of selectively lit lights. Light bar 700 is similar to light bar 600 of FIG. 10, although light bar 700 can be located anywhere on the vehicle and does not necessarily indicate a braking function in addition to an intention to parallel park. Light bar 700 includes fourteen vertically oriented columns and six horizontally oriented rows of lights, although any pattern of lights capable of indicating the intention of the driver can be used. FIGS. 11A-11C illustrate an exemplary repeating sequence of displays that can be used to illustrate both a braking function and a parallel parking intention. FIG. 11A illustrates all lights of light bar 700 lit, for example, indicating application of a brake of the vehicle. FIG. 11B illustrates a portion 720 of the lights of light bar 700 lit to indicate a "P" to indicate a desire to parallel park. Additionally, side portions 710 of light bar 700 can be maintained in a lit pattern to continue to indicate a application of a brake. FIG. 11C illustrates a portion 730 indicating an arrow point to the left and downward, indicating a desire to park in a parking space to the left and rearward of the vehicle. Additionally, side portions 710 of light bar 700 can be maintained in a lit pattern to continue to indicate a application of a brake. The patterns of FIGS. 11A-11C can be cycled upon light bar 700 to indicate both activation of a brake function for the vehicle and an intention to park upon the same display. In another embodiment, light bar 700 can be configured to flash words such as "PARK-ING" and "LEFT" in sequence to indicate a desired parallel parking maneuver to other drivers.

In addition or in the alternative to a light bar, a digital display such a liquid crystal display can be used to communicate a parallel parking intent to other vehicles. Such a display would need to be bright enough to attract the attention of and clearly communicate to drivers of other vehicles.

FIG. 12 illustrates an exemplary turn signal including PAL indicator lights incorporated therewith. Rearward facing turn signal device 800 includes lamp 810 configured to illuminate face 812 to selectively indicate turning and/or braking of the vehicle. Face 812 is typically colored red. Lamp 820 is additionally included and is configured to illuminate face 822 to selectively indicate activation of a reverse gear in the vehicle. Face 822 is typically clear or silver in color to provide a white light to a viewer. Signal device 800 is additionally equipped with PAL indicator lights to indicate for parallel parking maneuvers to the left side of the vehicle. Parallel parking mode portion 830 includes a "P" indication and can be selectively illuminated to indicate to other drivers an intention to parallel park. Arrow 840 includes arrow head 842 and arrow shaft sections 844 and 846, which can be lit constantly or lit in cycles to indicate a desire to park to the left and front of the vehicle. Similarly, arrow 850 includes arrow head 852 and arrow shaft sections 854 and 856, which can be lit constantly or lit in cycles to indicate a desire to park to the left and rearward of the vehicle. A mirror image turn signal to signal device 800 can be used on a right side of the vehicle to indicate similarly for maneuvers to the right side of the vehicle.

FIG. 13 illustrates a headlamp device of a vehicle including PAL indicator lights incorporated therewith. Headlamp device 900 includes lamp 910 configured to shine headlights in front of a vehicle. Device 900 further includes PAL indicator lights to indicate for parallel parking maneuvers to the left side of the vehicle. Arrow head 920 can be lit with arrow shaft sections 924 and 926 to indicate a desire to park to the right and rearward of the vehicle. Arrow head 922 can be lit with arrow shaft sections 924 and 926 to indicate a desire to park to the right and forward of the vehicle. Arrow heads 920 and 922 and arrow shaft sections 924 and 926 can be of a bright color, such as amber, or contrasting color, such as blue, to provide for clear communication of a parallel parking intention even when lamp 910 is illuminated.

FIG. 14 illustrates exemplary controls enabling a driver to control the PAL system installed to an instrument panel of a vehicle. Instrument panel 1000 is illustrated including speed gauge 1002 and radio controls 1004. Parking mode activation button 1010 is configured to initiate or cancel a parking mode. Desired parallel parking maneuver buttons 1012 are configured to indicate a desired parking maneuver into a spot to the left and front of the vehicle, to the right and front of the vehicle, to the left and rear of the vehicle, or to the right and rear of the vehicle. Additionally or alternatively, camera device 1020 is situated on instrument panel 1000 and is configured to capture images of the driver. By analyzing images of the driver, hand gestures, visual cues, or head orientation of the driver can be used to indicate to a particular spot and can be used as inputs to the PAL system. In one embodiment, a pair of camera devices can be used, such that the difference in two simultaneous images or sequence of images from the two cameras can be used to judge and receive as inputs the motions of the driver with improved accuracy.

FIG. 15 illustrates a vehicle equipped with the PAL system providing an audio warning to a pedestrian walking proximately to the vehicle. Vehicle 1200 is illustrated equipped with detection device 1210 including a view angle 1212 behind the vehicle. Pedestrian 1220, who could be visually impaired and may not see PAL light bars equipped to vehicle 1200, might accidentally walk into the path of vehicle 1200 performing a parallel parking maneuver. Vehicle 1200 includes a speaker device configured to emit an audible message outside the vehicle stating "WARNING VEHICLE PARALLEL PARKING" to caution pedestrian 1220. Such an audio warning can be useful not only in alerting pedestrians and bicyclists, but can also improve confidence of the driver of vehicle 1200 to overcome fears of parallel parking.

FIG. 16 illustrates a vehicle equipped with the PAL system situated between two open parking spaces. Vehicle 1100 is illustrated including turn signals 1110, headlamps 1120 and a brake lamp 1101 equipped to indicate a braking function and additionally to indicate activation of a parking mode. Any of turn signals 1110, headlamps 1120 and a brake lamp 1101 can be equipped with arrow indicators or word designations according to the disclosure. Curb 1106 is illustrated including open parking spaces 1102 and 1104 separated by paint line 1108 defining the parking spaces. Vehicle 1100 can use any of the inputs disclosed herein to identify the candidate parking spaces as open and determine a driver intention to one of the spaces. According to one embodiment, the PAL system can determine a bearing 1130 to parking space 1102 and a bearing 1140 to parking space 1104, and based upon a time weighted average viewpoint of the driver, as determined by a camera taking images of the driver's face, the PAL system can indicate to a particular space selected from spot 1102 and spot 1104 based upon that average viewpoint.

The PAL system can utilize vehicle sensors such as cameras, radar, or LIDAR to confirm presence of an open parking space or parameters related to a parking space. FIG. 17 illustrates a vehicle equipped with the PAL system evaluating a parking space as a candidate for a parallel parking maneuver. Vehicle 1300 is illustrated including a PAL system installed thereto including light bar indicator 1310. Parking space 1320 is illustrated next to curb 1330. Vehicles 1332 and 1334 are parked on either side of parking space 1320. Vehicle 1300 is additionally equipped with sensors that enable a computerized PAL module within vehicle 1300 to determine that parking space 1320 is available and further to determine parameters of the parking space including how much distance is available between vehicles 1332 and 1334. According to one embodiment, a threshold required parking space width can be compared to a monitored parking space width, as determined by the sensor inputs, and an output to the driver can be generated describing the parking space. For example, if the monitored parking space width is greater than the threshold required parking space width, a positive or affirming message can be provided to the driver confirming that the parking space is wide enough to execute a parallel parking maneuver. If the monitored parking space width is less than the threshold required parking space width, a buzzer or negative message can be provided to the driver indicating that the parking space is not wide enough for the intended maneuver. In one embodiment, the PAL system can be immediately activated for a confirmed parking space or can be prohibited from activating for a parking space that is determined to be not wide enough. In one embodiment, the threshold width that the PAL system uses to judge a parking space can be adjustable by the driver.

The PAL system, in one embodiment, notifies onlookers with both a light bar and an audio message that a parking maneuver is being initiated to another spot. In addition, any light or indicator system known in the art can be used to indicate to a viewer that the vehicle is being parked in a particular spot. FIG. 18 illustrates an exemplary vehicle equipped with PAL system using a laser to project a pattern and visually designate a parking space in which it is about to park. Vehicle 1400 is illustrated including PAL parking mode indicator light 1410 and a directional arrow 1412 indicating to a parking direction. Parking space 1430 is illustrated adjacent to vehicle 1400. Vehicle 1400 is equipped with systems disclosed herein for evaluating and identifying an open parking space. A laser emitter 1420 is illustrated configured according to devices known in the art such that emitter 1420 can scan ground proximate to vehicle 1400 and project a visible pattern 1440 on the ground, in particular at night or when luminescent paint is used on the parking space. In this way, the PAL system can further provide visual warning to an onlooker that a parking maneuver is about to be performed.

FIG. 19 illustrates an exemplary vehicle equipped with the PAL system automatically entering a parking mode based upon behavior of the vehicle in relation to parking spaces in a parking lot. Vehicles 1530 and 1520 are illustrate upon parking lot surface 1500. An aisle 1510 is defined as a space between rows 1512 and 1514 of parking spaces. Vehicles traverse aisle 1510, traveling substantially perpendicularly to parking space lines 1518 until a parking space is identified, and then the vehicle executing a parking maneuver can turn toward a parking space such that it is no longer perpendicular to lines 1518. A longitudinal axis 1522 of vehicle 1520 can be defined. By comparing axis 1522 to parking space lines 1518, the PAL system can keep the parking mode in a standby state because axis 1522 remains perpendicular to lines 1518. In another example, longitudinal axis 1536 of vehicle 1530 can be defined. By comparing axis 1536 to parking space lines 1518, the PAL system can activate the parking mode because axis 1536 is less than some threshold parking angle as compared to lines 1518, indicating that the vehicle 1530 has turned toward a parking space. Parking mode 1532 and direction arrow 1534 can be activated based upon the system comparing axis 1536 to lines 1518. Additionally, based upon the indicated direction and a positional relationship of vehicle 1530 to parking space 1516, the PAL system of vehicle 1530 can automatically identify parking space 1516 as the target parking space and provide a laser light pattern 1538 within parking space 1516, as disclosed in relation to FIG. 18. Additionally, vehicle 1530 is illustrated providing an audio parking warning.

FIG. 20 illustrates exemplary vehicles equipped with the PAL system automatically entering a parking mode based upon behavior of the vehicle in relation to an open parking space along a side of the roadway, in accordance with the present disclosure. Parking space 1600 is illustrate on a roadway between parked vehicle 1602 and 1604. Based upon identification of parking space 1600 and behavior of the vehicle in relation to the parking space, the PAL system can automatically enter parking mode. For example, a vehicle 1610 is illustrated in front of parking space 1600 preparing to back into the space and an alternative vehicle 1620 is illustrated preparing to pull forward into parking space 1600. Vehicle 1610 includes front wheels 1611 and 1613. By comparing an angle 1614 of front wheels 1611 and 1613 to longitudinal axis 1612 of vehicle 1610, an intention of the driver of vehicle 1610 to pull into space 1600 can be inferred. Additionally, information like the speed of vehicle 1610, a forward or reverse gear of vehicle 1610, or proximity of a navigational waypoint for vehicle 1610 can further be used to infer the intention of the driver. The PAL system can activate indicator lights 1616 based upon the behavior of vehicle 1610. Similarly, vehicle 1620 includes front wheels 1621 and 1623. By comparing an angle 1624 of front wheels 1621 and 1623 to longitudinal axis 1622 of vehicle 1620, an intention of the driver of vehicle 1620 to pull into space 1600 can be inferred. Additionally, information like the speed of vehicle 1620, a forward or reverse gear of vehicle 1620, proximity of another vehicle 1610, or proximity of a navigational waypoint for vehicle 1620 can further be used to infer the intention of the driver. The PAL system can activate indicator lights 1626 based upon the behavior of vehicle 1620.

The disclosed laser projection system of FIG. 18 can be used with or without a parallel parking system. FIG. 21 illustrates an exemplary vehicle equipped a laser projector to project a pattern and visually designate a parking space in which it is about to park. Vehicle 1700 is illustrated including laser projector 1720 configured to project an image upon a surface. Parking spot 1730 is illustrated, including an exemplary reflective paint coating. Reflective paint coatings are known in the art and can, for example, include small glass chips. In another embodiment, the cement or blacktop used to make a parking lot surface can include some small amount of glass chips in order to make the surface reflect laser light projected by projector 1720. Pattern 1740 is illustrated projected upon parking spot 1730 illustrating to other drivers an intent to park in that spot. Cameras and other sensors in vehicle 1700 can be utilized to identify the location of an open parking spot, and any number of input methods including touch screen display, verbal commands, and/or eye tracking hardware can be used to receive a user input to a particular parking spot.

FIG. 22 illustrates the vehicle of FIG. 21 projecting a pattern and visually designating an impending lane change upon a road surface. Vehicle 1700 is illustrated including projector 1720. Vehicle 1700 is within lane 1752 on vehicle surface 1750. A user in vehicle 1700 can utilize a turn signal, touch screen, or similar input to provide a user input stating an intention to change lanes. Projector 1720 can project pattern 1756 upon lane 1754 indicating an intention for the user to change lanes and move vehicle 1700 into lane 1754. Pattern 1756 can optionally include words, arrow signs, or other graphic indications. Cameras and other sensors in vehicle 1700 can be utilized to identify lanes of travel upon a road surface.

FIG. 23 illustrates an exemplary bus vehicle equipped a laser projector to project a pattern and visually designate a bus stop in which it is about to stop. Bus 1800 is illustrated including laser projector 1805. A painted portion 1820 of a road surface is illustrated which can be provided at a bus stop. Additionally, a vertical sign panel 1810 is illustrated next to the bus stop. Laser light can be projected upon either or both of painted portion 1820 in the road surface and vertical sign panel 1810. Light reflected from painted portion 1820 or sign panel 1810 can indicate to other drivers that bus 1800 intends to stop at the bus stop. Cameras and other sensors in bus 1800 can be utilized to identify the location of a bus stop and attendant painted portions and sign panels.

FIG. 24 illustrates an exemplary school bus vehicle equipped a laser projector to project a pattern and visually designate a bus stop in which it is about to stop and project lines for other vehicle to stop in observance of school bus stop traffic laws. Bus 1900 is illustrated including laser projectors 1902 and 1904. A vehicle can use more than one laser projector, for example, to achieve a 360 degree arc of projection. A painted portion 1910 of a road side curb is illustrated which can be provided at a bus stop. Laser light can be projected upon painted portion 1910 to indicate an intention to stop the bus. Additionally, laser light can be projected on a road surface in front of and behind bus 1900 to create graphics 1912 and 1914 to indicate to and remind other drivers of a traffic law requirement to maintain proper distance from a parked school bus. Cameras and other sensors in bus 1900 can be utilized to identify the location of a bus stop and attendant painted curbs.

FIG. 25 illustrates an exemplary vehicle upon a road surface, including sensors monitoring an operating environment of the vehicle, wherein the vehicle is equipped with a driver nudge system useful to warn a driver of the vehicle of a neighboring vehicle blocking an intended lane change. Vehicle 2010 is illustrated within a left lane 2022 of road surface 2020. Vehicle 2010 is equipped with sensors and a computerized processor useful to monitor and diagnose conditions on road surface 2020 proximate to vehicle 2010. Sensors can include but are not limited to cameras, radar, LIDAR, and ultrasonic devices. The computerized processor can include programming useful to monitor the sensor data, diagnose location and orientation of the vehicle within lane 2022, and diagnose other conditions within the operating environment around vehicle 2010 such as the presence and location of vehicle 2012 in right lane 2024 of road surface 2020. Based upon the orientation of vehicle 2020 and inputs to the controls of the vehicle such as an angle of a steering wheel, a potentially dangerous trajectory of vehicle 2020 can be diagnosed and alerted.

FIG. 26 illustrates a steering wheel of the vehicle of FIG. 25, wherein a driver is applying a clockwise force consistent with an intended lane change to the right and wherein the vehicle nudge system, sensing a neighboring vehicle blocking the intended lane change, provides an exemplary three nudges to the steering wheel in the counter-clockwise direction. Steering wheel 2100 is illustrated which can be used to control a vehicle such as vehicle 2020 of FIG. 25. Steering wheel 2100 can include sensors useful to monitor an angle of steering wheel 2100. Further, sensors can be useful to sense force or torque applied to steering wheel 2100. Based upon the direction or based upon force applied to steering wheel 2100, and based upon diagnosed position and orientation of the vehicle upon a road surface, an intended lane change of the vehicle can be diagnosed. When a potentially dangerous trajectory of the vehicle is diagnosed, a warning can be output to the driver of the vehicle. In the exemplary embodiment of FIG. 26, a nudge or a plurality of nudges can be generated as force or rotation outputs to steering wheel 2100 in an opposite direction of the lane change turn being indicated. Three counter-clockwise arrows indicates in the exemplary embodiment of FIG. 26, the nudge takes the form of three perceptible counter-clockwise outputs to the steering wheel.

A nudge used to warn a driver can be an actual motion of the steering wheel. A nudge used to warn a driver can be a torque applied to the steering wheel, which changes a force feedback felt by the driver, without actually turning the wheel.

In one embodiment, the force applied to the steering wheel to generate the disclosed nudge can be transmitted through a steering wheel solidly attached to a steering column, a shaft configured to mechanically transfer torque and rotation from the steering wheel to steering systems in the vehicle to change an orientation of wheels of the vehicle in relation to the rest of the vehicle. In another embodiment, the steering wheel and the steering column can be adjustably connected, for example, with an electric motor and gear system located between the steering wheel and the steering column being useful to permit small relative rotation of the steering wheel in relation to the steering column. Such a small relative rotation can be useful, for example, to provide a nudge to the steering wheel without affecting an actual rotational orientation of the steering column. In another example, an additional electric motor and gear system located between the steering column and a rigid body of the vehicle being useful to stabilize the steering column despite nudges being output upon the steering wheel.

FIG. 27 illustrates the steering wheel of FIG. 26 in side view, illustrating exemplary details useful to generate a nudge to the steering wheel in either of a clockwise or counter-clockwise direction. Steering wheel 2100 is illustrated connected to steering column 2130. Under normal operation of steering wheel 2100, a turning input by the driver of the vehicle applied to steering wheel 2100 turns steering column 2130 to control the vehicle. However, steering wheel 2100 is configured to rotate relative to steering column 2130 through control of electric motor 2120 configured to manipulate a gearing system 2110 which translates rotational output of motor 2120 into relative rotation of steering wheel 2100 and steering column 2130.

FIG. 28 illustrates in sectional view exemplary details of a steering wheel that can be used to generate a nudge to the driver in either a clockwise or counter-clockwise direction, including a steering column stabilizer useful to filter movement from the nudge from control input to the steering column. The illustrated steering wheel of FIG. 28 is similar to the steering wheel of FIG. 27 with alternative details. Steering wheel 2200 and steering column 2230 are illustrated. Steering column 2230 includes an axle configured to rotate. Steering wheel 2200 is illustrated attached to steering column 2230 with an exemplary roller bearing 2202 facilitating smooth rotation of wheel 2200 relative to steering column 2230. Electric motor 2210 is mechanically attached to steering column 2230 and rotates with steering column 2230. Through activation of electric motor 2210, a control hear 2212 is turned, interacting with a ring gear 2220 attached to steering wheel 2200. In one embodiment, ring gear 2220 can extend all the way around the wheel. In another embodiment, a ring-shaped gear can be attached to a portion of steering wheel 2200 enabling only partial rotation of steering wheel 2200 relative to steering column 2230 through a small arc.

In one embodiment, an additional electric motor 2234 is mounted to either a body of the vehicle or to the steering column 2230, and control of motor 2234 can be used in combination with attached gear set 2232 to control a torque or movement of steering column 2230 in relation to the body of the vehicle. In one embodiment, motor 2234 can be used to filter out nudges applied to the steering wheel from affecting changes to steering column 2230, for example, by applying an equal and opposite torque to steering column 2230 as are applied to steering wheel 2200 by motor 2210. In another embodiment, motor 2234, with or without the presence of motor 2210 and the attached gearset, can be used to apply torque or movement to steering column 2230 which can then be transmitted to steering wheel 2200.

FIG. 29 illustrates through a plurality of exemplary data plots operation of a driver nudge system. Time is illustrated on a horizontal axis. Measurable values of driver nudge system values are illustrated on the vertical axis for five different plots. Plot 2300 illustrates a steering column orientation. At a start of the plot, the steering column is centered, and then the steering column is turned in a first direction. Plot 2302 illustrates a warning value of the driver nudge system, with sensor inputs being used to indicate a discreet warning. Through most of the plot, the value of plot 2302 is zero indicating no warning. However, at some point in the test, the value turns to a value of one, indicating that a diagnosed trajectory of the vehicle is determined to be dangerous. Plot 2300 indicates that just prior to the warning value becoming one, the steering column was additionally rotated in the first direction, which is consistent with the driver of the vehicle attempting a sudden lane change. Plot 2301 illustrates rotation of the steering wheel of the vehicle. Throughout most of the illustrated time period, the rotation of the steering wheel is equal to the rotation of the steering column. However, upon indication of the warning value being changed to one, three nudge outputs are generated in the steering wheel, indicating through a tactile output that the driver can feel, that the wheel should be turned back in a second direction opposite from the first direction. Plot 2304 illustrates a motor control value providing nudges to the steering wheel. Plot 2303 illustrates a second motor control value providing filtering control the steering column in an equal and opposite value to the motor control values of plot 2304. The resulting nudges are evident in the steering wheel rotation of plot 2301. Filtering of the nudges from affecting rotation of the steering column is evident in the steering column rotation of plot 2300. Both the steering wheel and steering column values indicate that the driver corrects back in the second direction consistent with re-centering the vehicle in an original lane after the nudges are output.

The details of the driver nudge system of FIGS. 25-28 and the operation of the driver nudge system of FIG. 29 are exemplary. A number of different systems and methods to generate similar nudges are envisioned. In one example, the steering wheel can control the vehicle by wire, with a sensed direction of the wheel being used to control rotation of the steering column. In such an embodiment, a motor can still be used to nudge the steering wheel, and the data gathered from the steering wheel used to control the steering column can be filtered, with the filtered data not including changes in the steering wheel location due to the nudges delivered. An electric motor that filters turning of the steering column can include a solenoid or similar linear motor applying a braking force or increased resistance to turning to the steering column as opposed to a rotational motor resisting turning of the steering column.

In one embodiment, an emergency situation can be diagnosed by analyzing the vehicle sensor inputs. For example, a dangerous crash situation can be diagnosed by sensing locations of neighboring vehicles. In another example, locked up wheels can be sensed through an anti-lock braking system and used to diagnose an emergency situation. In another example, sudden or violent inputs to the steering wheel and/or braking system can be used to diagnose an emergency situation. In such an emergency, the nudge system can be disabled to provide the driver with uninterrupted, un-nudged control of the steering wheel. In another exemplary emergency, when a direction to avoid a collision can be determined, the motors of the system can be used to automatically control the vehicle away from the threat.

The disclosed nudge system can be used in conjunction with the disclosed parallel parking system, for example, nudging the wheel of the vehicle if the system diagnoses that the vehicle is about to collide during a parking maneuver. For example, if the vehicle is parallel parking, the driver's wheel could be nudged in an opposite direction from the pending collision.

FIG. 30 illustrates an alternative embodiment of the driver nudge system, utilizing nudge outputs additionally or alternatively to the pedals of the vehicle. Steering wheel 2200 from FIG. 28 is illustrated. Based upon a diagnosed dangerous trajectory of the vehicle toward a left side of the vehicle, the steering wheel is illustrated receiving a nudge to the right or in a clockwise direction. Brake pedal 2410 and accelerator pedal 2420 are also illustrated. The pedals can similarly be acted upon by electrical motors controlled by the driver nudge system. The pedals can vibrate, tap, nudge, or otherwise be made to move to get the attention of the driver. In the embodiment of FIG. 30, the pedals are illustrated capable of moving or nudging laterally or to the side. Such movement would be small, for example, in a 3-7 mm range, with enough movement to be perceptible but not enough movement to cause the foot of the driver to lose contact with the pedal.

Additionally or alternatively, acceleration of the vehicle can be delayed or prevented based upon a diagnosed dangerous trajectory of the vehicle. If the driver nudge system diagnoses that a turned wheel and a depression of the foot pedal together indicate that the driver is going to cut-off or potentially cause an impact with a proximate driver of another vehicle, the system can selectively ignore the depression of the accelerator pedal and maintain a current speed. In addition or in the alternative, the system can automatically cut the throttle of the vehicle and/or activate the braking system in addition to intervening in steering the vehicle. Such an accelerator/braking intervention can be managed through a computerized module or similar structure operating an acceleration interruption system which can in turn be controlled or prompted by the disclosed nudge system.

The disclosed driver nudge system is useful for providing warnings at high speeds executing lane changes. However, it can also be used during parking maneuvers and navigating at slower speeds. For example, if you are turning into a parking spot and sensors determine that you are about to hit a parked car, the nudge system can encourage the driver to turn the wheel more in one direction or stop the vehicle to reassess.

It will be understood that the present system is useful to promote direct driver control of the vehicle while providing a warning to that driver. Vehicle control systems that wrest control away from the driver can be disorienting and ultimately cause the driver to become confused or to panic, especially in an already stressful situation such as suddenly stopped traffic or in the presence of an already unpredictable situation with a bad driver in the neighboring vehicle. Warning systems that vibrate a steering wheel or a seat back fail to communicate effectively with the driver, e.g., what is that vibration, do I have a phone call coming in? The disclosed system provides an emergent, direct indication to the driver of an important, urgent course correction that must be entered without taking control away from the driver.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A driver nudge system configured to warn a driver of a vehicle, the system comprising:
   a steering wheel;
   a steering column;
   a vehicle sensor configured to monitor an operating environment of the vehicle;
   at least one motor configured to:
      control rotation of the steering wheel by nudging the steering wheel to rotate about the steering column in a first direction that is an opposite direction to a threat diagnosed according to data from the vehicle sensor; and
      control rotation of the steering column by applying a torque to the steering column in a second direction that is an opposite direction to the first direction,
   wherein the steering wheel and the steering column can rotate relative to each other, such that when the at least one motor nudges the steering wheel in the first direction and applies the torque to the steering column in the second direction, relative rotation between the steering wheel and the steering column is reduced.

2. The system of claim 1, wherein the steering column includes a shaft connecting the steering wheel to steering mechanisms in the vehicle.

3. The system of claim 1, wherein the at least one motor is configured to provide an equal and opposite torque to the steering column as compared to the nudge.

4. The system of claim 1, further comprising an accelerator interruption system configured to stop the vehicle from accelerating based upon the threat diagnosed according to data from the vehicle sensor.

5. The system of claim 1, further comprising a separate motor providing a nudge to one of an accelerator pedal or a brake pedal based upon the threat diagnosed according to data from the vehicle sensor, wherein the nudge generates a lateral or side-to-side movement in the one of the accelerator pedal or the brake pedal.

6. The system of claim 1, further comprising a parallel parking indication system comprising an arrow light and a parallel parking indication light.

7. A driver nudge system configured to warn a driver of a vehicle, the system comprising:
   a steering wheel;
   a vehicle sensor configured to monitor an operating environment of the vehicle;
   a steering column;
   at least one motor configured to:
      nudge the steering wheel in an opposite direction to an input from the driver in response to a threat diagnosed according to data from the vehicle sensor, wherein the nudge includes multiple, perceptible outputs from the at least one motor that turn the steering wheel in the opposite direction to the driver input; and
      control rotation of the steering column by applying torque to counter the nudge to the steering wheel and maintain a rotational orientation of the steering column, filtering out the nudge applied to the steering wheel.

8. The system of claim 7, wherein the steering column includes a shaft connecting the steering wheel to steering mechanisms in the vehicle.

9. The system of claim 7, wherein the steering wheel and the steering column can rotate relative to each other, such that when the at least one motor nudges the steering wheel, relative rotation between the steering wheel and the steering column can be reduced, and wherein and wherein the nudge includes three rotations of the steering wheel in the opposite direction to the input from the driver.

10. The system of claim 7, wherein the at least one motor is configured to provide an equal and opposite impulse to the steering column as compared to the impulse provided by the nudge.

11. The system of claim 7, further comprising an accelerator interruption system configured to stop the vehicle from accelerating based upon the threat diagnosed according to data from the vehicle sensor.

12. The system of claim 7, further comprising another motor providing a nudge to one of an accelerator pedal or a brake pedal based upon the threat diagnosed according to data from the vehicle sensor, wherein the nudge generates a lateral or side-to-side movement in the one of the accelerator pedal or the brake pedal.

13. The system of claim 7, further comprising a parallel parking indication system comprising an arrow light and a parallel parking indication light.

14. The system of claim 7, further comprising a gear system configured to translate rotational output of the at least one motor to rotation of the steering wheel or the steering column.

15. A driver nudge system configured to warn a driver of a vehicle, the system comprising:
  a steering wheel;
  a first sensor configured to monitor an operating environment of the vehicle and receive data indicative of threats to the vehicle in the operating environment;
  a second sensor configured to monitor inputs to the steering wheel, wherein steering mechanisms of the vehicle are controlled according to data from the second sensor; and
  a motor configured to control rotation of the steering wheel by nudging the steering wheel in an opposite direction to a threat diagnosed according to data from the first sensor,
  wherein nudging includes multiple discrete tactile outputs felt by the driver in the form of rotations of the steering wheel, and
  wherein the data from the second sensor is filtered to remove data indicative of the nudging delivered by the motor to the steering wheel.

16. The system of claim 15, wherein the motor includes an electric motor or a solenoid, and wherein the nudging includes three rotations of the steering wheel in the opposite direction to the threat.

17. The system of claim 15, wherein the data from the second sensor used to control the steering mechanisms of the vehicle is filtered to exclude changes to an angle of the steering wheel resulting from nudges delivered by the motor.

18. The system of claim 15, further comprising another motor providing a nudge to one of an accelerator pedal or a brake pedal based upon the threat diagnosed according to data from the first sensor, wherein the nudge generates a lateral or side-to-side movement in the one of the accelerator pedal or the brake pedal.

19. The system of claim 15, further comprising a parallel parking indication system comprising an arrow light and a parallel parking indication light.

20. The system of claim 1, further comprising a gear system configured to translate rotational output of the at least one motor to rotation of the steering wheel or the steering column.

* * * * *